(12) United States Patent
Bickford et al.

(10) Patent No.: US 8,943,444 B2
(45) Date of Patent: Jan. 27, 2015

(54) SEMICONDUCTOR DEVICE RELIABILITY MODEL AND METHODOLOGIES FOR USE THEREOF

(71) Applicant: International Business Machines Corporation, Armonk, NY (US)

(72) Inventors: Jeanne P. Bickford, Essex Juntion, VT (US); Nazmul Habib, South Burlington, VT (US); Baozhen Li, South Burlington, VT (US); Pascal A. Nsame, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/922,311

(22) Filed: Jun. 20, 2013

(65) Prior Publication Data

US 2014/0380261 A1    Dec. 25, 2014

(51) Int. Cl.
    *G06F 17/50*    (2006.01)
(52) U.S. Cl.
    CPC .................................. *G06F 17/5009* (2013.01)
    USPC .............................. 716/55; 716/126; 716/139
(58) Field of Classification Search
    CPC .......... G06F 11/22; G06F 17/50; G06F 15/04
    USPC ............................................ 716/55, 126, 139
    See application file for complete search history.

(56) References Cited

U.S. PATENT DOCUMENTS

| 6,789,032 B2 | 9/2004 | Barbour et al. |
| 8,380,478 B2 * | 2/2013 | Houston ..................... 703/14 |
| 2012/0191384 A1 | 7/2012 | Kalgren et al. |

FOREIGN PATENT DOCUMENTS

| CN | 102567560 | 7/2012 |
| JP | 2011077287 | 4/2011 |

OTHER PUBLICATIONS

Bickford et al., "Systems and Methods for System Power Estimation", U.S. Appl. No. 13/605,050, filed Sep. 6, 2012; 27 Pages.
Bickford et al., "Product Reliability Estimation", U.S. Appl. No. 13/605,168, filed Sep. 6, 2012; 29 Pages.

* cited by examiner

*Primary Examiner* — Thuan Do
(74) *Attorney, Agent, or Firm* — David Cain; Roberts Mlotkowski Safran & Cole, P.C.

(57) ABSTRACT

Systems and methods for semiconductor device reliability qualification during semiconductor device design. A method is provided that includes defining performance process window bins for a performance window. The method further includes determining at least one failure mechanism for each bin assignment. The method further includes generating different reliability models when the at least one failure mechanism is a function of the process window, and generating common reliability models when the at least one failure mechanism is not the function of the process window. The method further includes identifying at least one risk factor for each bin assignment, and generating aggregate models using a manufacturing line distribution. The method further includes determining a fail rate by bin and optimizing a line center to minimize product fail rate. The method further includes determining a fail rate by bin and scrapping production as a function of a manufacturing line excursion event.

8 Claims, 19 Drawing Sheets

SEMICONDUCTOR DEVICE RELIABILITY MODEL AND METHODOLOGIES FOR USE THEREOF

FIELD OF THE INVENTION

The invention relates to systems and methods for semiconductor device design and fabrication and, more particularly, to systems and methods for semiconductor device qualification and reliability assessment during semiconductor device design.

BACKGROUND

Large numbers of semiconductor devices are commonly used in a single piece of electronic equipment or product, and these semiconductor devices often handle the primary functions of the electronic equipment such that high reliability of the semiconductor devices has become ever more important as reliance on electronic equipment increases for everyday functions. Generally the reliability of semiconductor devices depends on their resistance to stresses applied to the devices, such as electric stress, thermal stress, mechanical stress, and environmental stress (humidity, etc.). If part of a semiconductor device has a defect or particularly weak structure, the defect or weak structure may react adversely to the applied stress, and such an adverse reaction may cause failures in the semiconductor device.

Semiconductor devices have failure mechanisms dependent on product use conditions or the various stresses applied to the devices that are unique to semiconductors, and resolving these problems during the process development stage is an important element for providing high reliability of the semiconductor devices. For example, typical failure mechanisms that can pose problems in the process development stage of semiconductor devices may include time-dependent dielectric breakdown (TDDB), hot carrier injection (HCI), biased temperature instability (BTI), soft error rate (SER), retention disturbance, electromigration (EM), stress migration (SM), and TDDB between metal lines.

More specifically, TDDB may cause reliability issues within gate dielectric film (i.e., process element) of the semiconductor device because bias applied to a gate electrode for a long period of time may produce defects in the gate dielectric film that increase micro leak current and the eventual breakdown of the dielectric. HCI may cause reliability issues within the transistor (i.e., process element) of the semiconductor device because high-energy electrons and holes generated by impact ionization of electrons accelerated by high electric fields may be trapped in the oxide film causing transistor characteristics to fluctuate. BTI may cause reliability issues within the transistor of the semiconductor device because application of a bias at high temperatures may increase the interface state and fixed charge causing the transistor characteristics to fluctuate.

SER may cause reliability issues within the memory device (i.e., process element) of the semiconductor device because high-energy cosmic ray particles may cause memory data rewrite errors, which is typically a temporary data error. Retention disturbance may cause reliability issues within the memory device of the semiconductor device because long-term storage or operating environment stress may cause the trapped charge in a Flash memory to disappear inverting the data. EM may cause reliability issues within the metal lines (i.e., process element) of the semiconductor device because the physical impacts between electrons and metal atoms cause the metal atoms to move, creating voids in the metal lines. SM may cause reliability issues within the metal lines of the semiconductor device because vacancies (e.g., atom holes) in copper lines due to metal line stress may induce a creep phenomenon causing voids to form and grow. Lastly, TDDB between metal lines may cause reliability issues within the interlayer films of the semiconductor device because dielectric breakdown may result in a short-circuit between metal lines.

Reliability device simulators are capable of modeling these failure mechanisms and have become an integral part of the design process of semiconductor devices. For example, the failure mechanisms may be modeled using the simulators during the semiconductor device design process in order to set fail rates such that the semiconductor device may operate reliably for a minimum expected useful life. The semiconductor device reliability may be measured by failure rate in FIT. The FIT is a unit, defined as one failure per billion part hours. The semiconductor industry typically provides an expected FIT for every product that is sold based on operation within the specified conditions of voltage, frequency, heat dissipation and etc. Hence, a semiconductor device reliability model is a prediction of the expected mean time between failures (MTBF) for a semiconductor device as the reciprocal of the sum of the FIT rates for every component.

Conventionally, reliability failure mechanisms are evaluated as the semiconductor device technology is developed, and one fail rate may be set for the entire manufacturing process distribution for each of the failure mechanisms. Thereafter, all of fail rates set for the individual failure mechanisms are combined together to set one fail rate for the semiconductor device. Stable semiconductor device reliability may be provided by verifying the required reliability when developing each process element and reflecting these results in the design rules of the semiconductor device.

However, the conventional processes for verifying semiconductor device reliability do not account for variation as a function of the process window (e.g., fast or slow based on front end of the line (FEOL) or back end of the line (BEOL) processes). For example, some reliability failure mechanisms have a probability of occurrence that changes through a process window distribution. Specifically, BTI and HCI vary as a function of the FEOL process window whereby there are more fails seen at the slow end of the process distribution. On the other hand, TDDB and EM also vary as a function of the FEOL process window, but there are more fails seen at the fast end of the process distribution. Additionally, some failure mechanisms do not vary as a function of the process window but instead may have relationships to other process window variation, e.g., stress voids (via size, metal content), defects (overlay, pitch), and chip package interaction (CPI) (metal content).

Conventional reliability processes comprises a composite of failure rate analysis based on multiple failure mechanisms that are typically overbound or underbound because the reliability models are performed on a single set of hardware or semiconductor devices, and do not consider where the hardware or semiconductor devices fall within the manufacturing process window distribution. For example, when conventional models are run with limits (e.g., worst case parameters) in the specific process window in which they are bounded, the models are not capable of accurately portraying what the reliability output of the entire manufacturing line may be. Therefore, the conventional reliability models may not reflect true product reliability.

Accordingly, there exists a need in the art to overcome the deficiencies and limitations described herein above.

SUMMARY

In a first aspect of the invention, a method is provided that includes defining performance process window bins for a performance window. The method further includes assigning a percentage of manufacturing line distribution to each of the performance process window bins. The method further includes determining at least one failure mechanism for each bin assignment. The method further includes determining whether the at least one failure mechanism determined for each bin assignment is a function of the process window. The method further includes that when the at least one failure mechanism determined for each bin assignment is the function of the process window, generating different reliability models for the at least one failure mechanism for each bin assignment. The method further includes that when the at least one failure mechanism determined for each bin assignment is not the function of the process window, generating common reliability models for the at least one failure mechanism for each bin assignment. The method further includes identifying at least one risk factor for each bin assignment. The method further includes generating aggregate models using the manufacturing line distribution.

In another aspect of the invention, a method is provided that includes generating an aggregate reliability model using a manufacturing line distribution. The method further includes selecting a line center within a process window of the aggregate reliability model. The method further includes assigning a percentage of the manufacturing line distribution to each performance process window bin within the process window. The method further includes calculating a product fail rate for each of the performance process window bins. The method further includes optimizing the line center to minimize the product fail rate for each of the performance process window bins.

In a yet another aspect of the invention, a method is provided that includes generating an aggregate reliability model using a manufacturing line distribution of a semiconductor product. The method further includes defining performance process window bins of a performance window for an excursion event of the semiconductor product. The method further includes determining a fail rate for each of the performance process window bins. The method further includes disposing of production for the semiconductor product as a function of the fail rate determined for each of the performance process window bins.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

Figure 1:
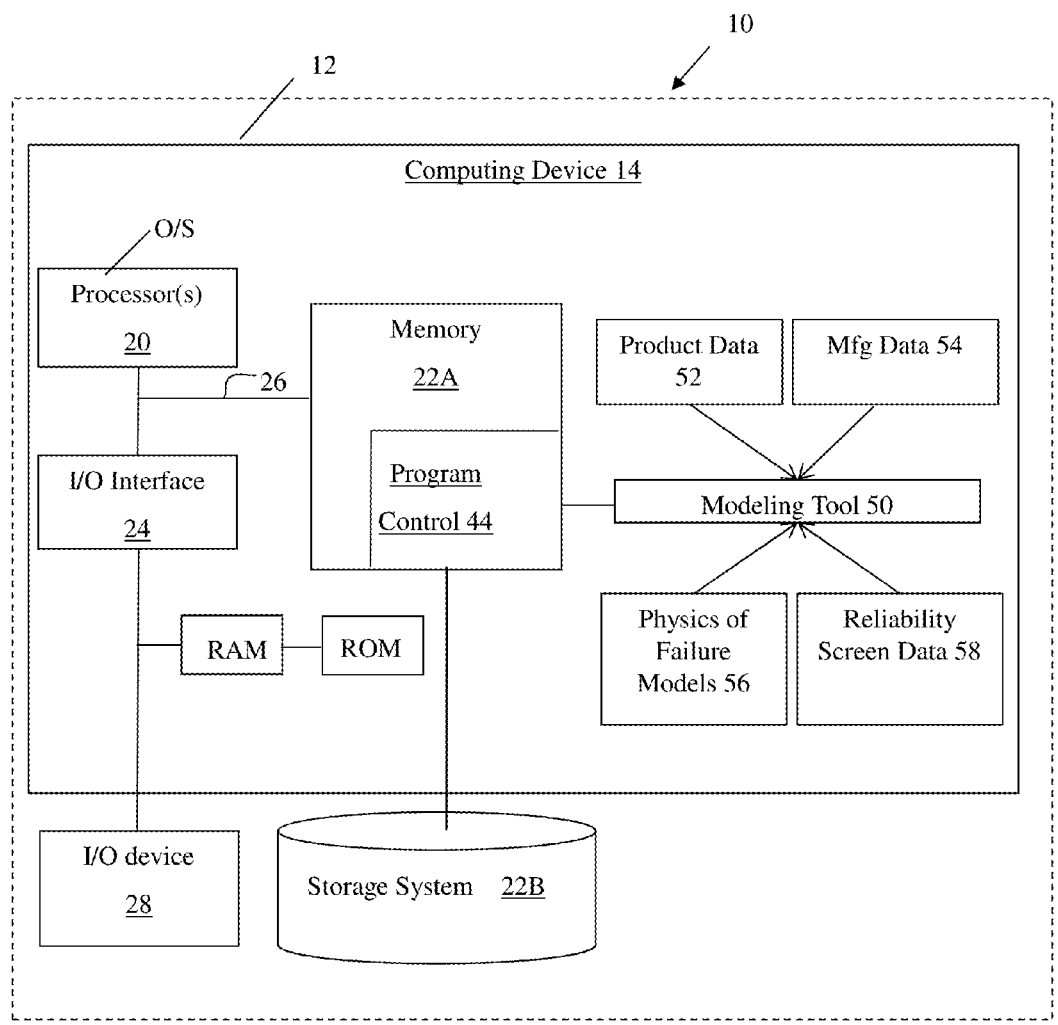
FIG. 1 is an illustrative external environment for implementing the invention in accordance with aspects of the invention.

The invention relates to systems and methods for semiconductor device design and fabrication and, more particularly, to systems and methods for semiconductor device qualification and reliability assessment during semiconductor device design. Implementations of the present invention provide improved reliability modeling techniques that are designed to set fail rates as a function of process window distribution and generate process window dependent reliability models for each bin.

The process window is a collection of values of process parameters that allow semiconductor devices to be manufactured and to operate under desired specifications. In accordance with aspects of the present invention, the process window may be expressed as a range allowed in a given technology node (e.g., −3 to +3 sigma), and the process window bins may each be established by segmenting the process window.

In embodiments, the fail rates may be set by assigning a unique fail rate for each bin or defining a common fail rate for each bin depending on whether the failure mechanism is a function of the process window. Advantageously, these approaches allow for the creation of aggregate or integrated models for each bin that take into consideration variation across the process window.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes at least one processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard, etc.

In general, the at least one processor 20 executes computer program code (e.g., program control 44), which can be stored in the memory 22A and/or storage system 22B. Moreover, in accordance with aspects of the invention, the program control 44 controls a modeling tool 50 (e.g., an electronic design automation (EDA) tool) to perform the processes described herein. The modeling tool 50 can be implemented as one or more program code in the program control 44 stored in memory 22A as separate or combined modules. Additionally, the modeling tool 50 may be implemented as separate dedicated processors or a single or several processors to provide the function of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the modeling tool 50 may be configured to receive and/or store product data 52 regarding a semiconductor device, manufacturing data 54 regarding the manufacture of the semiconductor device, physics of failure mechanism models 56, and reliability screen data 58 for performing the processes of the present invention. In embodiments, the modeling tool 50 may be configured to define bins (e.g., a subset of a total process) for a performance process window, and assign a percentage of manufacturing distribution to each performance process window bin. The modeling tool 50 may further be configured to generate specific failure mechanism reliability models for each bin when a failure mechanism is determined as a function of the process window, and generate a flat failure mechanism reliability model (e.g., the same fail level is generated for each bin) when a failure mechanism is determined as not being a function of the process window. Thereafter, the modeling tool 50 may be configured to identify high risk factors for each bin that may cause the first semiconductor device to fail, and generate an aggregate model using manufacturing line distributions.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Semiconductor Reliability Model and Methodology

Semiconductor reliability verification generally takes into account semiconductor device failure modes in each stage of semiconductor device production from process development through mass production. The failure time due to wear-out failure (e.g., intrinsic failure) of semiconductor devices, that is to say the life of the semiconductor device, may be determined by the failure mechanisms of the process elements for each semiconductor device.

Figure 2:
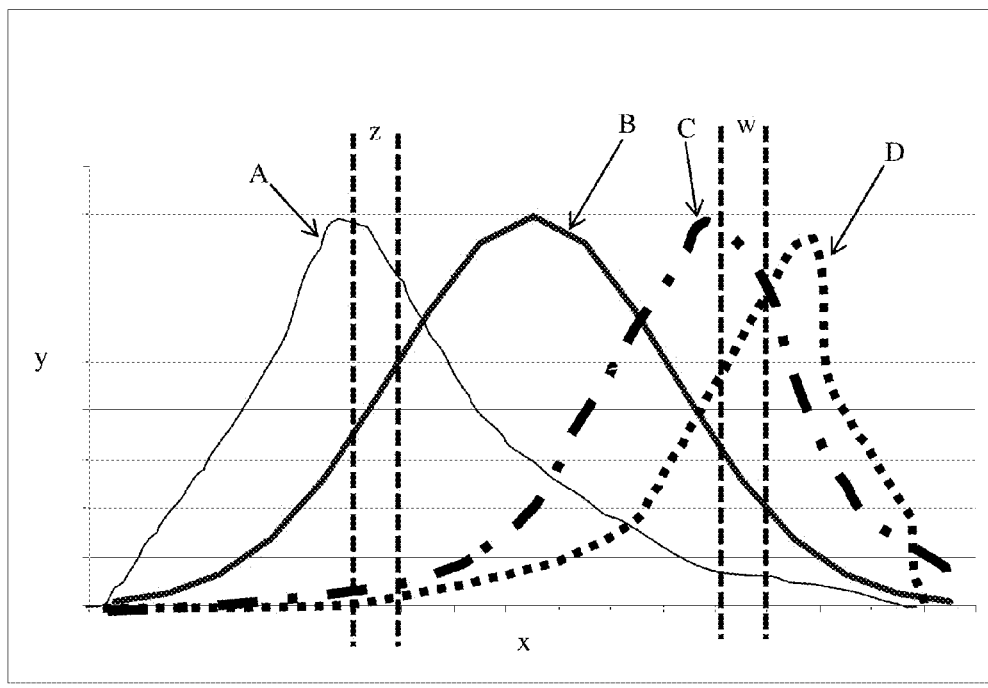
FIG. 2 is a graph illustrative of the change in the probability of occurrence of various failure mechanisms across a process window distribution in accordance with aspects of the invention.

However, conventional methods for setting reliability models to confirm that the prescribed reliability is satisfied do not account for variation as a function of the process window. In other words, current reliability models do not reflect an entire process distribution, and thus the failure rates set for each failure mechanism do not account for variation as a function of the process window. For example, as illustrated in FIG. 2, failure mechanisms A, B, C, and D have a probability occurrence "y" that changes through the process window distribution "x" (e.g., −3 to +3 sigma). Therefore, when failure mechanism models are run with limits on the space "z" within the process window distribution "x" the failure mechanism models may not accurately portray the actual reliability of the manufacturing line or product. For instance, failure mechanism models C and D that are run with limits on the process space "z" within the process window distribution "x" may not demonstrate any reliability issues, which does not accurately portray the actual reliability of the manufacturing line or product that includes semiconductor devices that fall outside of process space "z" (e.g., semiconductor devices within process space "w" in which the failure mechanism models C and D may demonstrate a higher probability for reliability issues).

Figure 3:
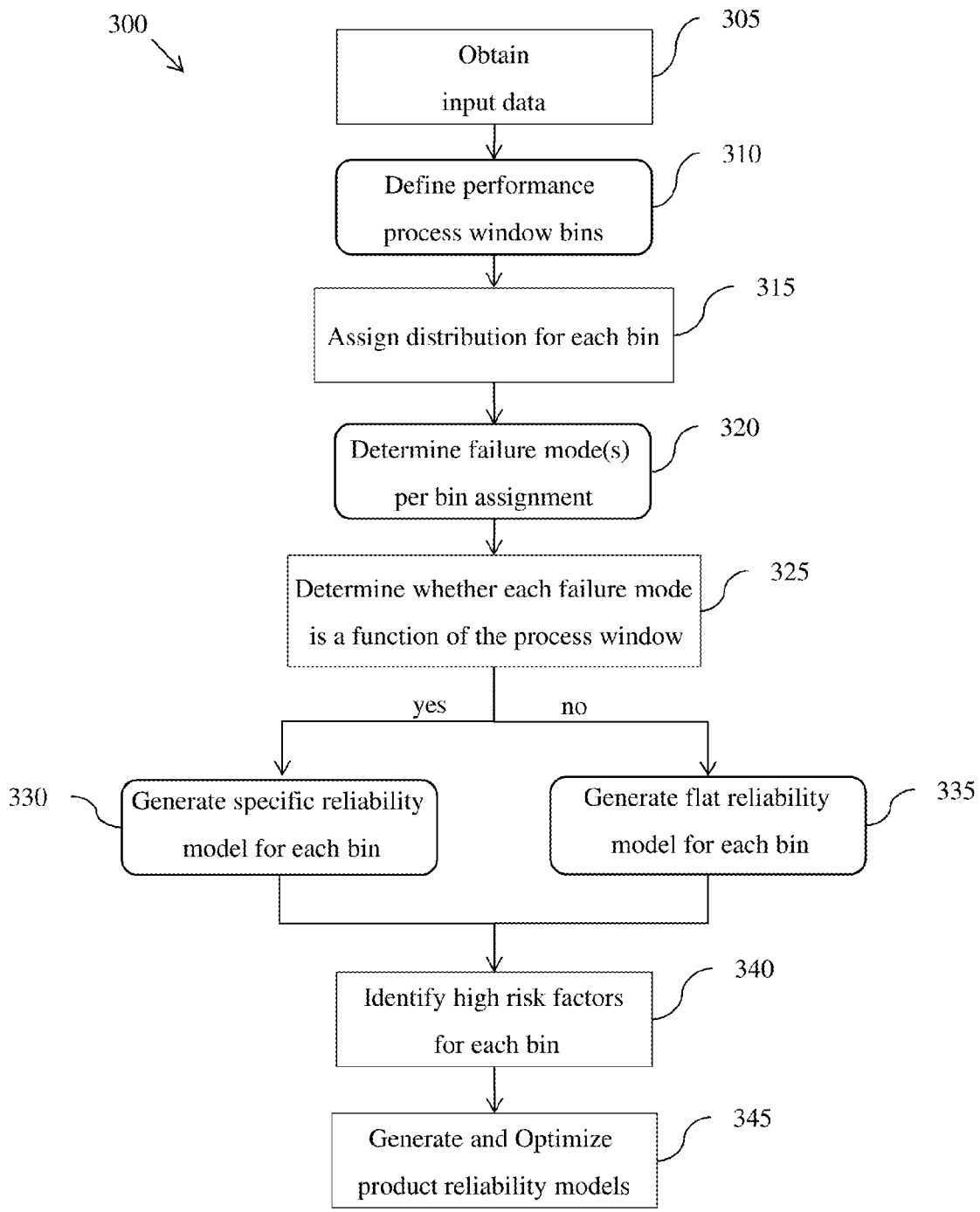
FIGS. 3 and 4 are illustrative process flows of implementing the system in accordance with aspects of the invention.
Figure 4:
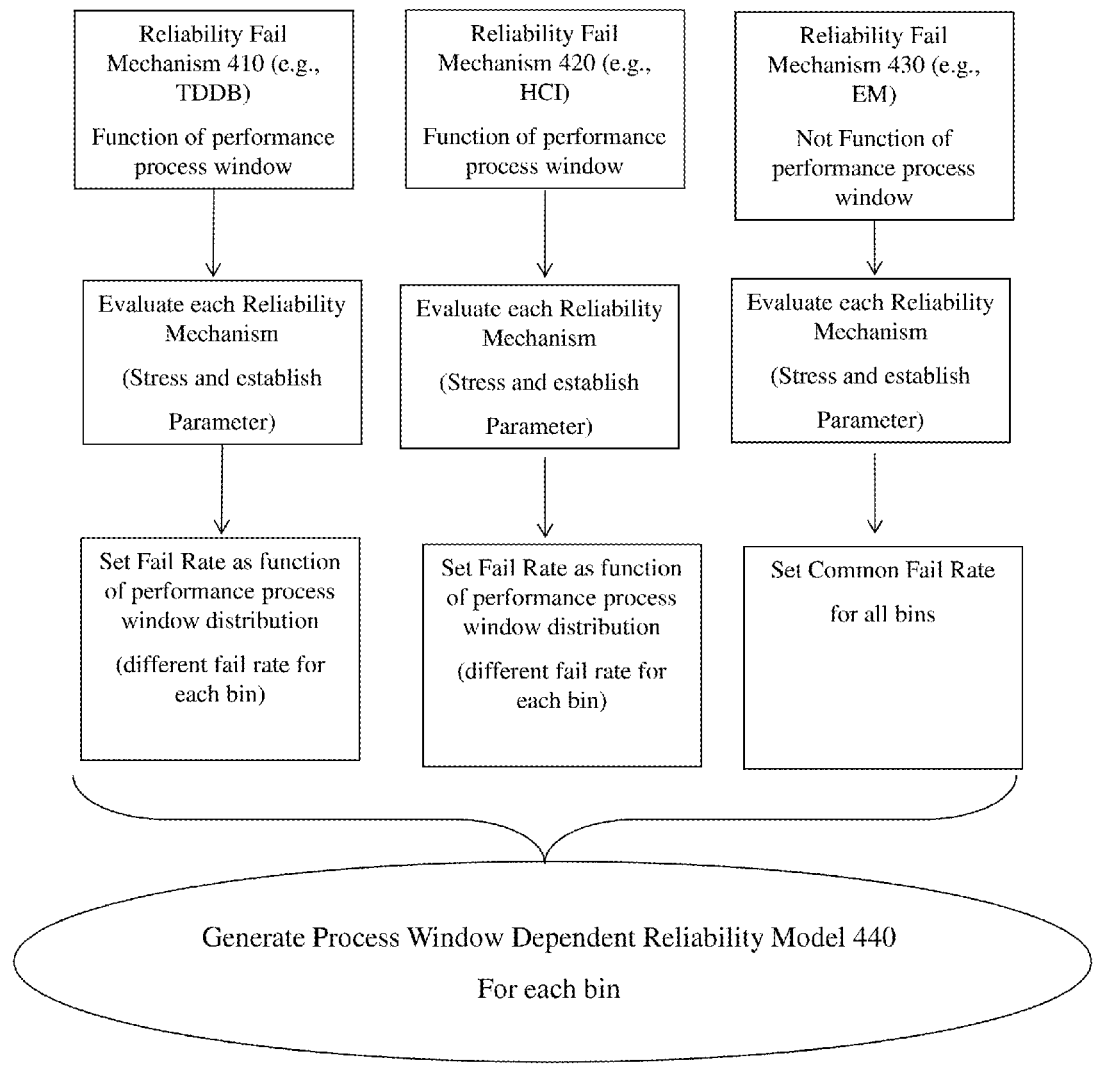

Accordingly, embodiments of the present invention provide systems and methods that generate aggregate or integrated reliability models that are set as a function of the process window distribution. FIG. 3 shows a semiconductor reliability assessment process 300 for at least one semiconductor device or product. FIG. 4 will be described in conjunction with processes of the semiconductor reliability assessment process 300 of FIG. 3 in order to better describe the processes.

FIG. 3 shows an exemplary flow for performing aspects of the present invention. The steps of FIG. 3 (and all other flows described herein) may be implemented in the environment of FIG. 1, for example. The flowchart and block diagrams in FIG. 3 (and all other flows described herein) illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As shown in FIG. 3, the process 300 may start at step 305 where input data is obtained for an exemplary reliability modeling (e.g., the modeling tool 50 may obtain the input data). In accordance with aspects of the present invention, the input data may comprise product data, manufacturing data, and physics of failure models. The product data and manufacturing data may include device layout schemes, layer thicknesses, layer materials, voltages, etc. The physics of failure models leverage the knowledge and understanding of the processes and failure mechanisms (e.g., TDDB, HCI, BTI, EM, etc.) that induce failure in semiconductor devices to predict reliability and improve the semiconductor device performance. The failure models may include degradation algorithms that describe how physical, chemical, mechanical, thermal, or electrical mechanisms evolve over time and eventually induce failure within the semiconductor devices.

At step 310, performance process window bins (e.g., subsets of a total process window) may be defined for a process window (e.g., FEOL or BEOL). For example, process variation may affect the operating or performance characteristics of the semiconductor device. These process variations may be significant enough that the semiconductor devices coming from the same manufacturing process cannot be used interchangeably, and instead may be sorted into separate bins comprising subsets of semiconductor devices whose operating characteristics fall within a predefined set of operating parameters for each bin. Therefore, in accordance with aspects of the present invention, performance process window bins may be established based on these operating or performance characteristics. For example, in some embodiments, a number of bins (e.g., 16 bins) may be established based on the clock speed of semiconductor devices across a manufacturing line distribution.

At step 315, a percentage of semiconductor devices representative of a subset of the manufacturing line distribution may be assigned to each performance process window bin. For example, a determined percentage representative of each subset of semiconductor devices whose operating characteristics fall within a predefined set of operating parameters for a bin may be assigned to that bin.

At step 320, failure mechanism(s) or mode(s) are provided for each bin assignment. For example, a determination is made as to which failure mechanism(s) such as TDDB, HCI, BTI, EM, etc. are to be evaluated for each bin assignment. In embodiments, this may be accomplished by examining the hardware's electrical characteristics. For example, if testing data shows higher metal wiring resistance in some higher speed bins, an evaluation of EM failure should be performed.

At step 325, a determination is made as to whether each provided failure mechanism (e.g., TDDB, HCI, BTI, EM, etc.) is a function of the performance process window. For example, this can be accomplished by plotting each failure mechanism as a function of the process window bin.

At step 330, when a failure mechanism is determined as a function of the performance process window, a specific reliability model (e.g., a different fail rate) of the failure mechanism may be generated for each performance process window bin. As illustrated in FIG. 4, reliability failure mechanisms 410 and 420 may be determined to be a function of the performance process window, and as such, each of the reliability failure mechanisms 410 and 420 are evaluated, and a different fail rate may be set for each of the reliability failure mechanism 410 and 420 as a function of the performance process window for each bin. For example, the EM failure mechanism may perceive an uplifted failure rate from the generic technology target in those bins, based on newly calculated current densities and metal line dimensions.

At step 335, when the failure mechanism is determined to not be a function of the performance process window, a flat reliability model (e.g., a same fail rate) of the failure mechanism may be generated for each performance process window bin. As illustrated in FIG. 4, reliability failure mechanism 430 is determined to not be a function of the performance process window, and as such, the reliability failure mechanism 430 is evaluated, and a common fail rate may be set for the reliability failure mechanism 430 for each bin. For example, if TDDB failure is not determined to be a function of performance window bin parameters, the pre-set technology failure target may be used.

At step 340, at least one risk factor (e.g., a highest risk factor or weakest link) is identified for each performance process window bin. In embodiments, the at least one risk factor may be a factor that will cause the first semiconductor device of the subset of semiconductor devices assigned to the bin to fail first. For example, the factor may include Vt, leakage, dielectric thickness, metal and via resistance and capacitance.

At step 345, aggregated or integrated reliability models are generated and optimized for each bin using the manufacturing line distributions. As illustrated in FIG. 4, a process window dependent reliability model 440 may be generated that takes into consideration the fail rates set for each failure mechanism for each bin. For example, each failure mechanism may be evaluated across the process window and a fail rate may be set for each process window bin. Thereafter, for each process window bin, a technology level model may be generated by aggregating the fails for each process window bin using the following formula (1).

$$F = 1 - \prod_i (1 - F_i) \tag{1}$$

where: i=a failure mechanism; and
$F_i$=is a function of the failure mechanism for example $F_i$=f(temperature, frequency, voltage).

Figure 5:
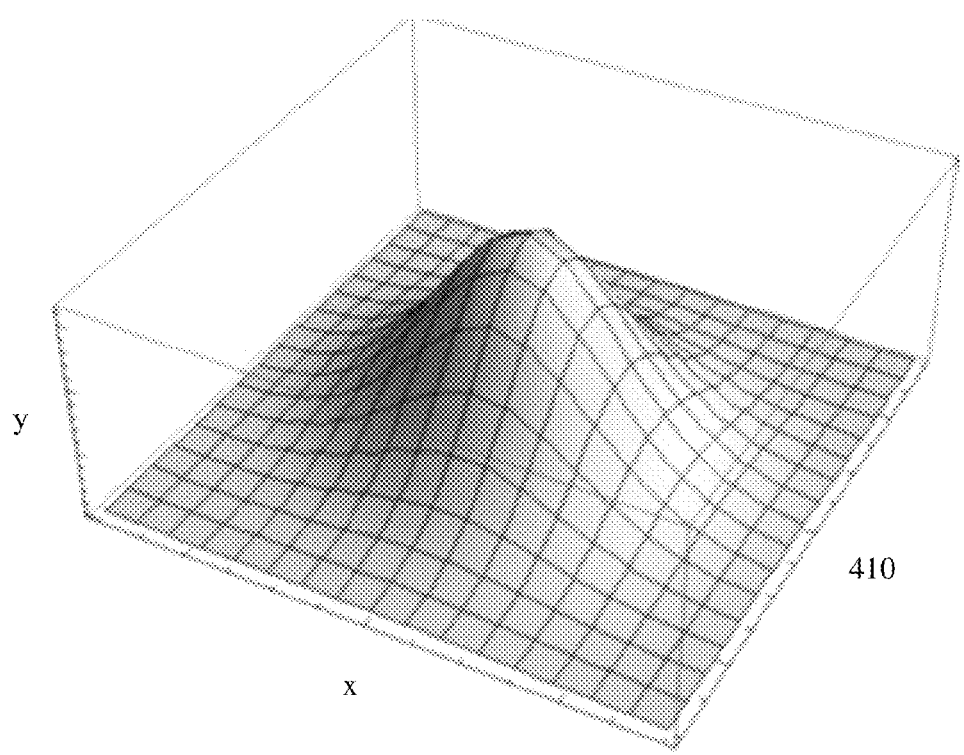
FIG. 5 is a graph illustrative of a percentage of manufacturing performance distribution in accordance with aspects of the invention.

FIG. 5 illustrates a percentage of manufacturing performance distribution in accordance with aspects of the present invention assuming a Gaussian distribution. Similar percentages can be determined for any statistical distribution. For example, failure mechanism 410 may be determined by the process 300 to have a probability occurrence "y" that changes through the process window distribution "x".

Line Re-Center to Optimize Reliability Based on the Semiconductor Reliability Model Semiconductor products generally have different reliability requirements. Conventional methodologies to provide for the different reliability requirements during semiconductor product manufacture include the implementation of various custom reliability screens (e.g., enhanced voltage screen (EVS), dynamic voltage screen (DVS), wafer thermal cycle, burn-in, etc., which stress the defects to increase their effects on the circuit-under-test by accelerated aging and make the defects easier to detect). However, these custom screens are not tied to the process window variation for mechanisms that cause reliability fails.

Moreover, conventional reliability models for these semiconductor products are typically generated using the assumption of only one reliability requirement for an entire product process distribution. Therefore, the manufacturing line cannot be centered to maximize reliability because the reliability models provide the same reliability across the entire process window. Additionally, there is no way to choose process points within the product process distribution to optimize reliability for a technology or for individual products.

Accordingly, embodiments of the present invention provide systems and methods that utilize the reliability models that are set as a function of the process window distribution, as described above, such that it is possible to effectively know what reliability for the semiconductor product should be at different points or parts of the process window distribution. Thereafter, the reliability for the semiconductor product may be optimized by choosing where to center the manufacturing line. Advantageously, this provides for the ability to efficiently create different levels of reliability for a same product.

Figure 6:
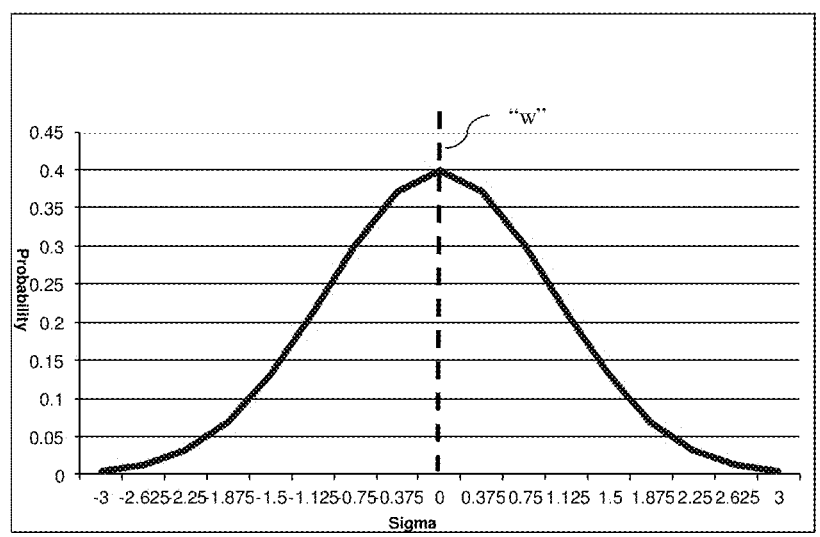
FIG. 6 is a graph illustrative of a line center for a process window distribution in accordance with aspects of the invention.

FIG. 6 illustrates a typical percentage manufacturing distribution assuming a Gaussian distribution with a line center ("w") set at zero. The line center ("w") is where the processes for the individual parameters or processes are set such that performance is centered on the zero nominal line. Changes to the parameters or process settings for a given tool (e.g., an EDA tool providing greater N or P doping) makes the line center ("w") shift up or down the distribution from the zero nominal line.

Figure 7:
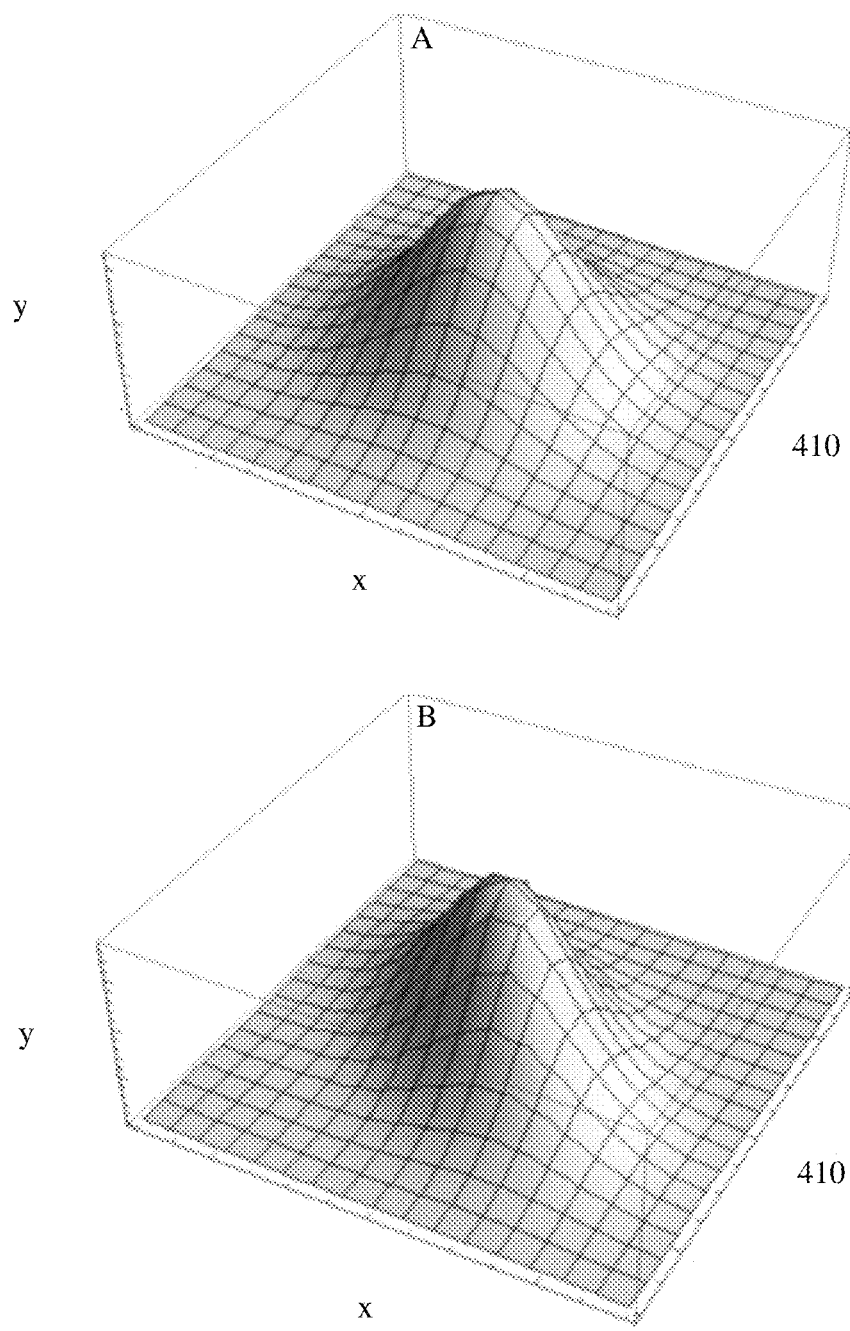
FIG. 7 are graphs illustrative of a percentage of manufacturing performance distribution in accordance with aspects of the invention.

FIG. 7 illustrates a percentage manufacturing performance distribution for two different cases "A" and "B" assuming a Gaussian distribution in a 3D environment. More specifically, FIG. 7 shows the failure mechanism 410 may be determined by the process 300 (discussed with respect to FIG. 3) to have a probability occurrence "y" that changes through the process window distribution "x". As can be seen between the two different cases "A" and "B" the probability for failure is significantly different between the two distributions. For example, the failure rate for each instance relates to a chosen point on the process distribution, and how much of the process is running at the chosen point.

In theory or practice, any number of parameters may be selected for the processes performed throughout instances "A" and "B" such that the 3D space is moved around to any point in the distribution and it is possible to observe that the probability of failure will vary as the 3D space is moved around, which demonstrates that there are certain points of the process distribution that are less prone to failure. Therefore, in embodiments of the present invention, it should be understood that the specific fail rate developed looking at the aggregated or integrated reliability models generated in process 300 (discussed with respect to FIG. 3) may be varied as a function of the technology being used and the quality of the processes selected to manufacture the technology (i.e., where the line center is positioned within the process distribution).

Figure 8:
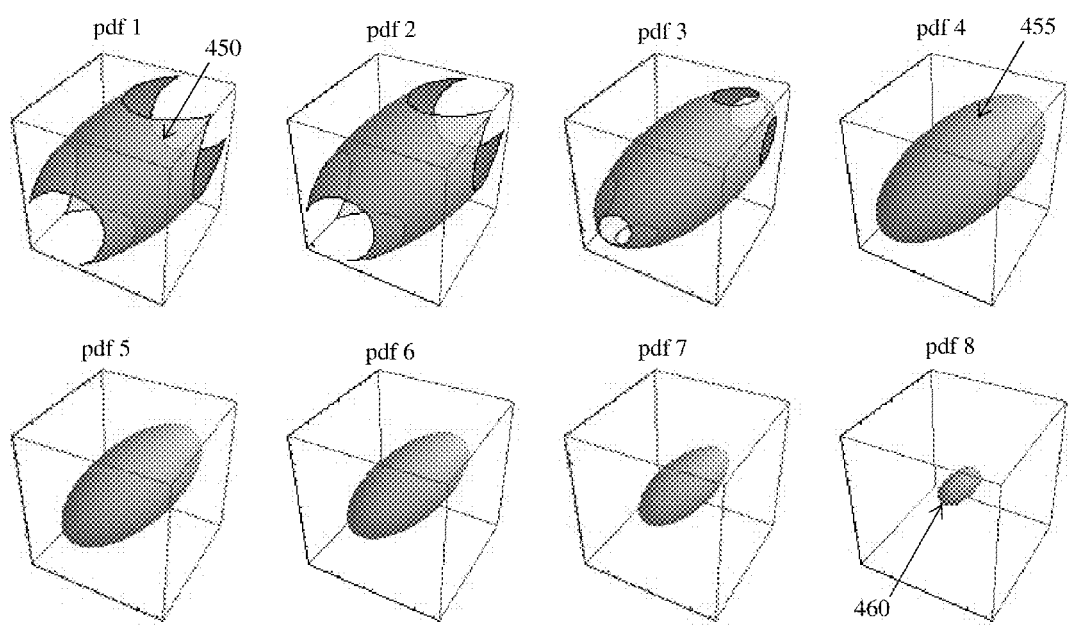
FIG. 8 is a schematic illustration of change in manufacturing performance distribution in accordance with aspects of the invention.

FIG. 8 shows a schematic to explain the change in the percentage manufacturing performance distribution for instance "A" discussed with respect to FIG. 7 assuming a Gaussian distribution as the probability density function variable (e.g., a normalized occurring frequency) changes. The probability density function (pdf), or density of a continuous random variable, is a function that describes the relative likelihood for this random variable to take on a given value. The probability for the random variable to fall within a particular region is given by the integral of this variable's density over the region.

As can be seen in FIG. 8, at pdf1 the variable is low and as a result a large process window 450 is available that is representative of a part of the process that allows for meeting reliability objectives. For example, the large process window 450 for pdf1 shows that there is the ability based on the model, even outside a part of the process allowed to run for other reasons such as functionality and performance, almost no problem hitting reliability objectives. The process window 455 in pdf4 shows that when the process window is centered within the limitations of functionality and performance, the process window provides for the optimal ability to hit reliability objectives. However, as the variable increases from a low value at pdf1 through pdf4 to a high value at pdf8, it is observed that the process window shrinks to a very small window 460 in which it would be very difficult to hit reliability objectives (e.g., substantially zero process space available for hitting reliability objectives).

Figure 9:
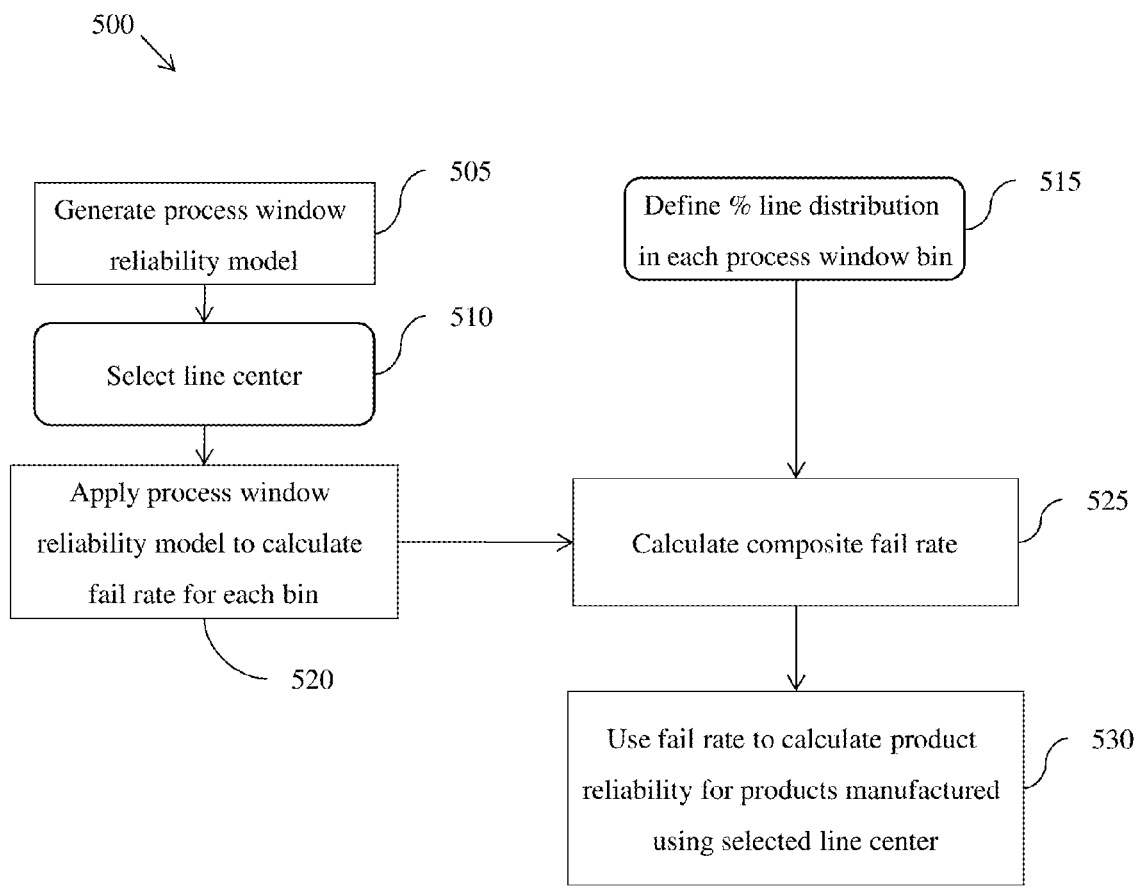
FIGS. 9-11 are illustrative process flows of implementing the system in accordance with aspects of the invention.
Figure 10:
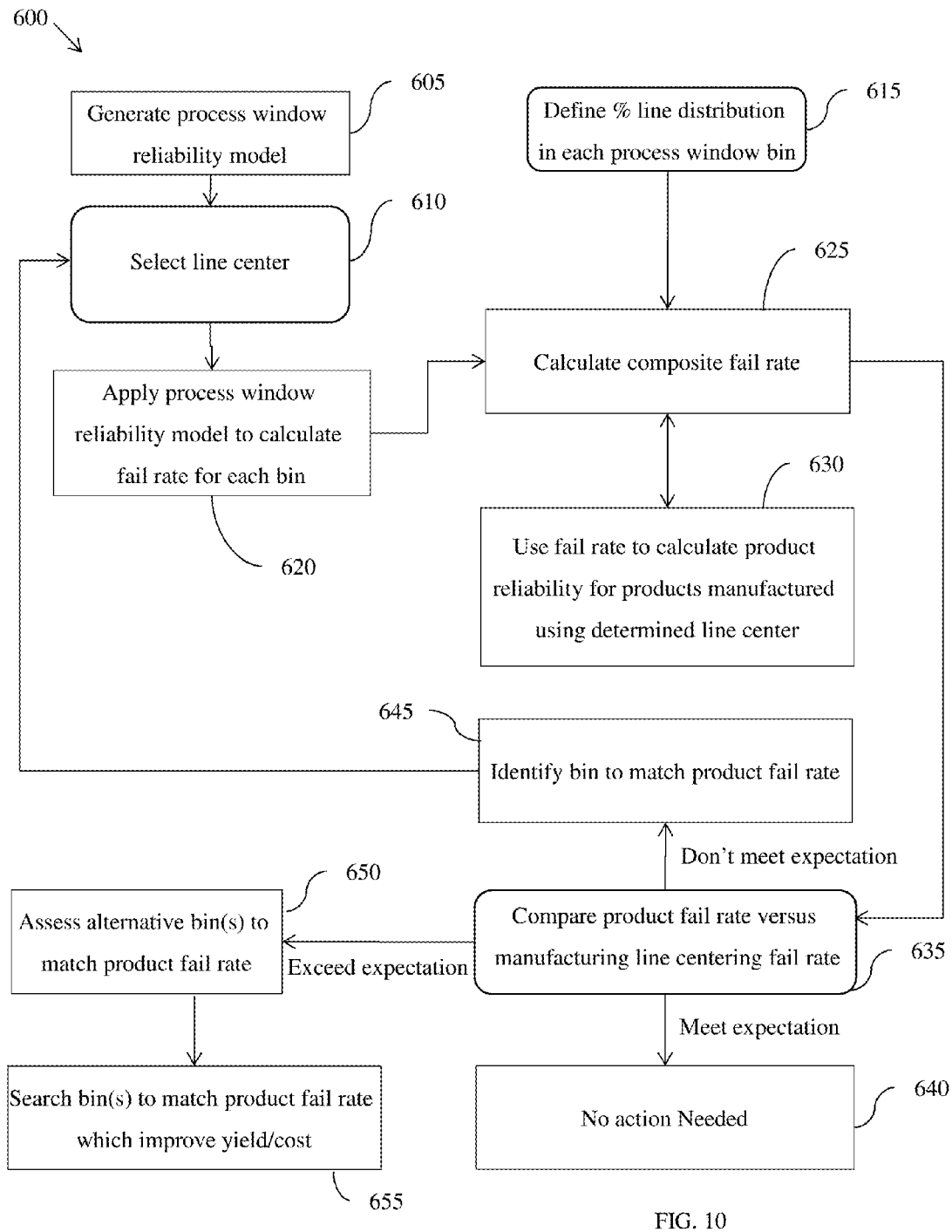
Figure 11:
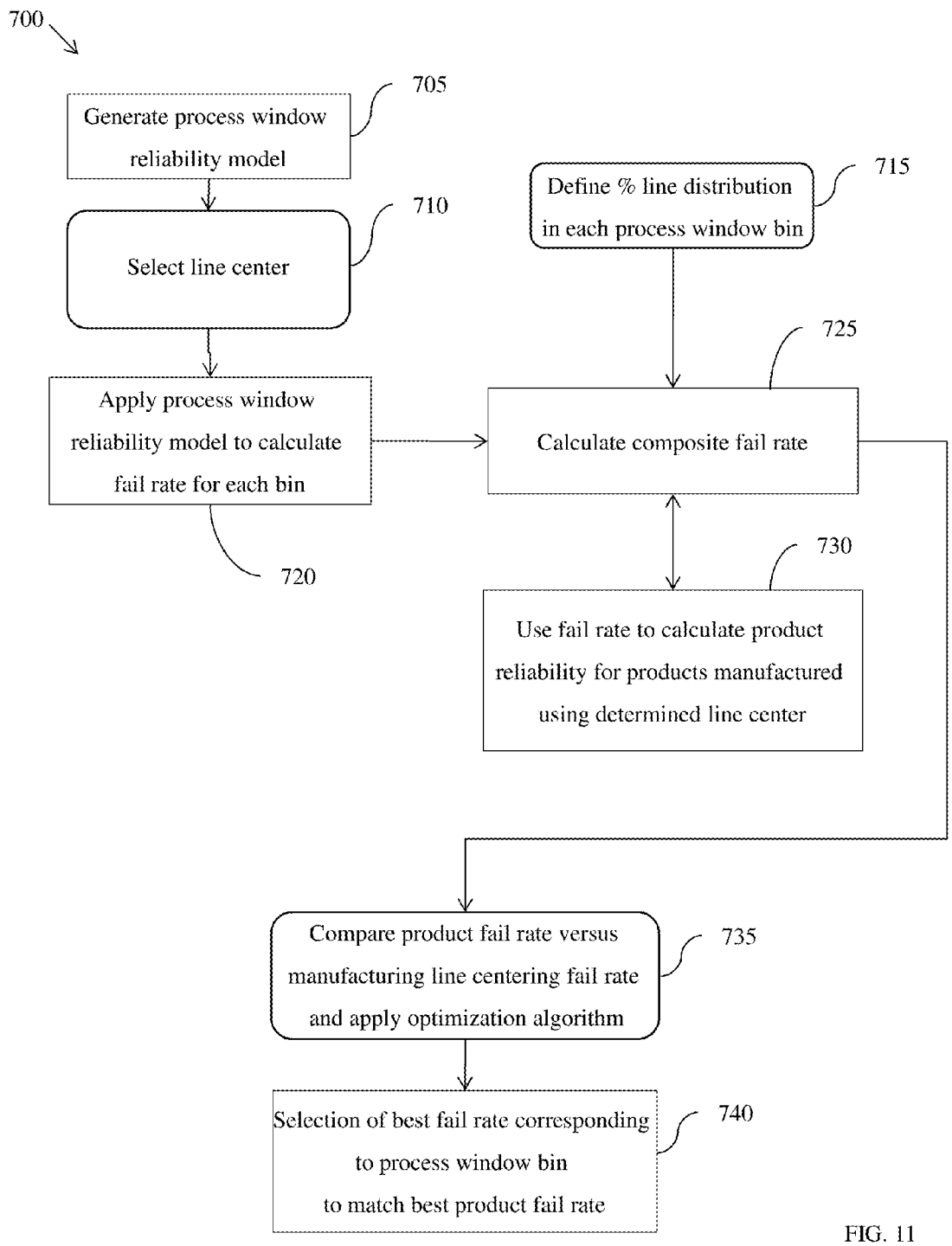

Accordingly, embodiments of the present invention provide systems and methods that assess reliability for a selected line center, select a line center that maximizes reliability, and/or select a line center that maximizes reliability based on reliability models and manufacturing distribution. More specifically, FIGS. 9, 10, and 11 show exemplary flows for performing aspects of the present invention such as assessing reliability for a selected line center, selecting a line center that maximizes reliability, and/or selecting a line center that maximizes reliability based reliability models and manufacturing distribution. The steps of FIGS. 9, 10, and 11 may be implemented in the environment of FIG. 1, for example.

FIG. 9 shows a process 500 for assessing the reliability for a selected line center. More specifically, the process 500 may start at step 505 where a process window dependent reliability model may be generated for at least one semiconductor device or product, as discussed with respect to process 300 shown in FIG. 3. In embodiments, the process window dependent reliability model may include the process window bin definitions (e.g., the number of bins that may be established based on the clock speed of semiconductor devices across a manufacturing line distribution) such that the process window dependent reliability model takes into consideration the fail rates set for each failure mechanism for each bin.

At step 510, a line center is selected within the process window such that performance is centered on a predetermined value (e.g., nominal, 1.5 sigma fast, 1.5 sigma slow, etc.). In embodiments, the line center is where the processes for the individual parameters or processes are set such that performance is centered on the predetermined value line.

At step 515, a percentage of the line distribution is defined for each process window bin. For example, 5% of the line distribution may be defined for the process window bin at 3 sigma fast, 15% of the line distribution may be defined for the process window bin at 1.5 sigma slow, 25% of the line distribution may be defined for the process window bin at nominal, etc. In embodiments, the line distribution may be Gaussian or any other distribution so long as the distribution is defined.

At step 520, the process window dependent reliability model is applied against each of the bins set up for the process window to calculate a fail rate for each of the bins. For example, different fail rates may be set for each of the reliability failure mechanisms as a function of the performance process window for each bin, as discussed above with respect to process 300 shown in FIG. 3.

At step 525, the fail rate for each bin and the percentage of the line distribution for each process window bin are used to calculate a composite fail rate. In embodiments, the composite failure rate may be for the entire distribution. For example, the percentage of the line distribution or the known amount of the process distribution for each bin from step 515 may be used in conjunction with the fail rate calculated for each bin in step 520 to calculate an overall composite fail rate for the at least one semiconductor device or product. In embodiments, the calculation of the overall composite fail rate may comprise performing a weight average of reliability.

At step 530, the calculated composite fail rate may be used to calculate a product reliability fail rate for semiconductor devices or products manufactured at the selected line center such that the reliability for the at least one semiconductor device or product is assessed for the selected line center.

FIG. 10 shows a process 600 for selecting a line center that maximizes reliability. More specifically, the process 600 may start at step 605 and continue through process step 630 as described above with respect to process 500 shown in FIG. 9. However, at step 635 the process 600 may enter an optimization phase to maximize reliability for the at least one semiconductor device or product by way of a "try to fit" process. In embodiments, the optimization phase may comprise optimizing the line center to minimize the product failure rate.

More specifically, at step 635 the product fail rate is compared to the manufacturing line centering fail rate and a determination is made as to whether the calculated product reliability meets product reliability requirements. When the calculated product reliability meets the product reliability requirements then no further action is needed and the process 600 stops at step 640.

However, when the calculated product reliability does not meet the product reliability requirements, then the process 600 continues at step 645. At step 645, the failure mechanisms used to generate the process window dependent reliability model are reevaluated and at least one new failure mechanism may be selected or provided to replace a previous failure mechanism and/or supplement the process window dependent reliability model, as discussed above with respect to process 300 shown in FIG. 3. In embodiments, the at least one new failure mechanism may have greater variation through process. Thereafter, a process point is identified within the process window that has a lower fail rate for the new failure mechanism, and steps 610-630 are repeated using a newly selected line center.

Additionally, when the calculated product reliability exceeds the product reliability requirements (e.g., more time and/or resource is being spent manufacturing the product than is necessary), then the process 600 continues at step 650. At step 650, the line center selected to assess reliability is reevaluated and at least one new line center may be selected. In embodiments, the reevaluation of the line center comprises assessing alternative bin(s) to match the product fail rate. For example, if the previous line center was at 2.0 sigma fast then the new line center may be selected as 2.5 sigma fast to provide a wider process window that still achieves the product reliability requirements and matches the product fail rate. At step 655, the newly selected line center may be evaluated (e.g., using process steps 615-635) to determine whether the newly calculated product reliability exceeds the product reliability requirements and achieves and/or improves yield and cost objectives of the product manufacture (e.g., extra time and resource is not being spent manufacturing the product than is necessary to achieve the reliability requirements for the product).

FIG. 11 shows a process 700 for selecting a line center that maximizes reliability based on the reliability model and manufacturing distribution. More specifically, the process 700 may start at step 705 and continue through process step 730 as described above with respect to process 500 shown in FIG. 9. However, at step 735 the process 700 may enter an optimization phase to maximize reliability for the at least one semiconductor device or product by way of a "best available" process. In embodiments, the optimization phase may comprise optimizing the line center to minimize the product failure rate.

More specifically, at step 735 the product fail rate is compared to the manufacturing line centering fail rate and a determination is made as to whether the calculated product reliability meets product reliability requirements. In embodiments, a flow (e.g., an algorithm) may be used to ensure that the best center line is selected to optimize the product reliability meeting the product reliability requirements. For example, the flow may include a search to find the "best available" values of some objective function given a defined domain including a variety of different types of objective functions and different types of domains. This would be a continuous process flow rather than the bin based process discussed with respect to process 600 shown in FIG. 10.

More specifically, in accordance with these aspects of the invention, the flow may include that for each given process bin, assume M reliability failure mechanisms being monitored, and the failure probability of mechanism i in bin j is $F_{ji}$, then the overall failure probability of bin j can be written as the following formula (2).

$$F_j = 1 - \prod_{i=1}^{i=M} (1 - F_{ji}), \quad (2)$$

Where $F_{ji}$ is a function of the bin parameters (i.e., the application parameters). For example, $F_{ji} = (f(f_j, Vdd_j ...)$ if speed f and Vdd are the bin parameters.

In embodiments, the reliability failure mechanisms may be ranked for each customer application condition based on application tolerance to actively manage $F_j$. For example, for lower power applications, EM may not be as critical, and thus bins may be chosen that exhibit a higher EM failure probability.

If the total N process bins are defined, and $\alpha_j$ is the population fraction of bin j, then the overall failure for the entire population (i.e., all bins) may be expressed as the following formula (3).

$$F = \sum_{j=1}^{j=N} \alpha_j F_j = 1 - \sum_{j=1}^{j=N} \alpha_j \prod_{i=1}^{i=M} (1 - F_{ji}) \quad (3)$$

At step 740, the best fail rate corresponding to the process window bin may be selected to match the best product failure rate. For example, the line could be centered such that 90% of the production population is distributed across 3 bins as opposed to 16 bins. Advantageously, these processes identify reliability associated with a line center, and achieve selection of a line center that optimizes the reliability of the at least one semiconductor device or product.

Disposition of an Excursion Product Based on the Semiconductor Reliability Model Excursions or departures from predictable outcomes of semiconductor device or product manufacture present a number of challenges for determining reliability of the semiconductor device or product and the disposition or shipping of the semiconductor device or product after manufacture. More specifically, conventional reliability models assume one reliability for the entire process distribution. Consequently, when excursions occur in the manufacturing line, the parts of the process distribution sensitive to one failure mechanism cannot be scrapped or burned in differently since the part of the process distribution that is specifically affected by the cause of the excursion cannot be identified using the one reliability model. Thus, conventional methods scrap a larger amount of parts from the process distribution, which results in greater cost with respect to fabrication of the semiconductor device or product.

Accordingly, embodiments of the present invention provide systems and methods that utilize the reliability models that are set as a function of the process window distribution, as described above, such that it is possible to effectively know what reliability for the semiconductor product should be at different points or parts of the process window distribution. Thereafter, shipment of the semiconductor product may be dispositioned as a function of the failure rate per each bin of the process window distribution. Advantageously, this provides for the ability to cost effectively disposition semiconductor product by minimizing scrapped product and reliability screen (e.g., burn-in, EVS, DVS, etc.) resources.

Figure 12:
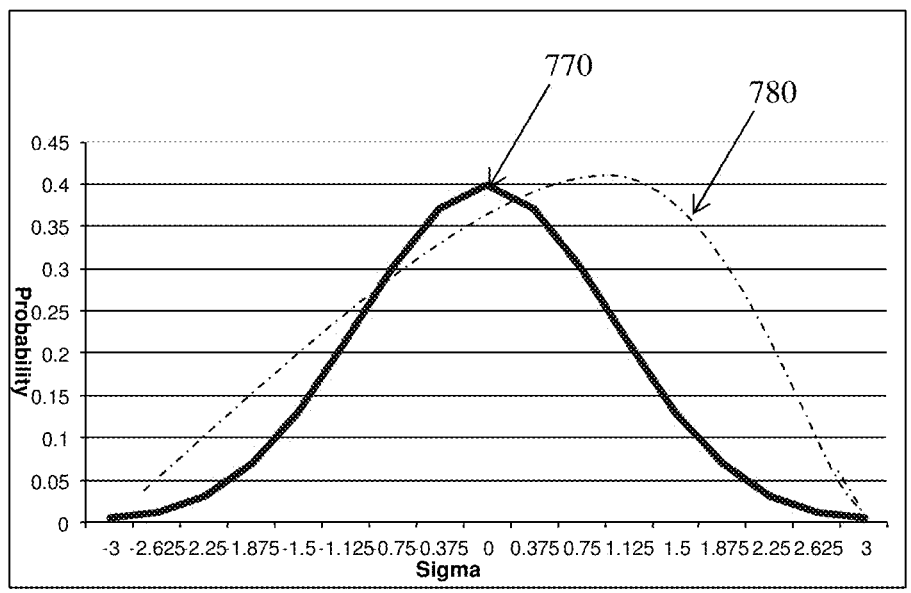
FIG. 12 is a graph illustrative of performance distribution excursion in accordance with aspects of the invention.

FIG. 12 illustrates a typical percentage manufacturing distribution 770 assuming a Gaussian distribution and a skewed manufacturing distribution 780. The skewed manufacturing distribution 780 represents the impact of an excursion (e.g., excursions may result from any number of failures during fabrication such as input of an incorrect recipe and tool failure) on the typical percentage manufacturing distribution 770. For example, in the instance of typical percentage manufacturing distribution 770, changes to the parameters or processes settings for a given tool may skew the distribution from the zero nominal line to the slow end of the process window, as shown by the skewed manufacturing distribution 780.

Figure 13:
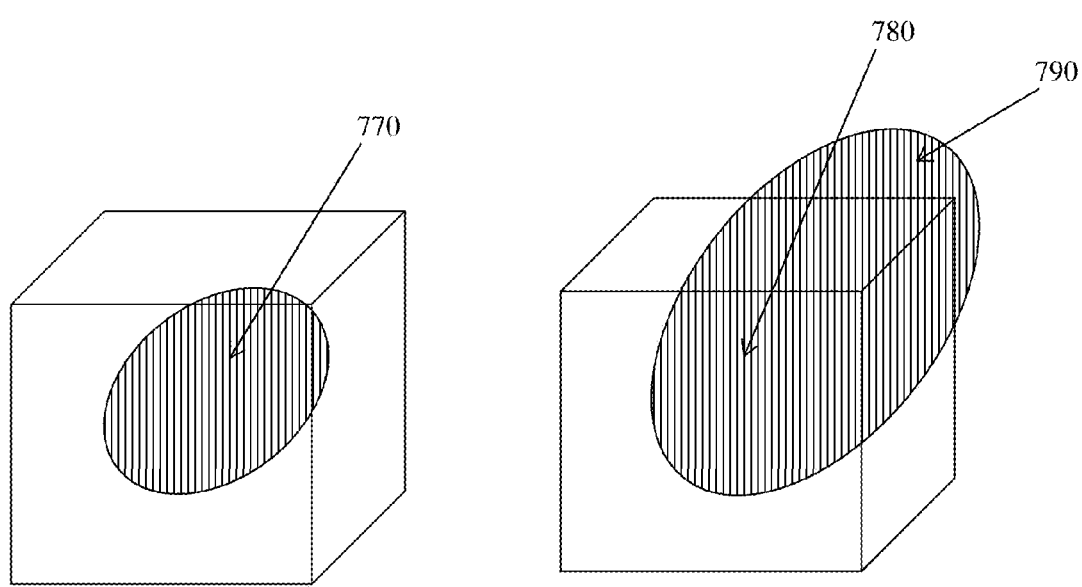
FIG. 13 is a schematic illustration of change in manufacturing performance distribution in accordance with aspects of the invention.

FIG. 13 shows a schematic to explain the change in the percentage manufacturing performance distribution for the typical percentage manufacturing distribution 770 discussed with respect to FIG. 12 when an excursion skews the manufacturing distribution. More specifically, changes to the parameters or process settings for a given tool (e.g., an excursion) skew the distribution of the typical percentage manufacturing distribution 770 to the skewed manufacturing distribution 780 in such a manner that a portion 790 of the skewed manufacturing distribution 780 is now outside of product specifications (i.e., outside of the box). In embodiments, the portion 790 outside of the box is determined to identify parts of the process distribution that are failing to meet reliability targets such that the semiconductor product can be effectively dispositioned.

Accordingly, embodiments of the present invention provide systems and methods that assess reliability for the excursion product, assess bins that meet target reliability, and disposition semiconductor product shipments in a manner that minimizes scrapped product and/or reliability screen resources. More specifically, as will be appreciated by one skilled in the art, FIGS. 14-18 show exemplary flows for performing aspects of the present invention such as assessing reliability for the excursion product when no burn-in is present and when burn-in is present, assessing bins that meet target reliability, and the disposition of semiconductor product that maximizes reliability based on reliability models and minimizes scrapping product and/or burn-in resources. However, it should be understood by one skilled in the art that burn-in is an example of a reliability screen and may be replaced or used in conjunction with other reliability screens, such as EVS, DVS, and other reliability screens, without departing from the scope and spirit of the described embodiments. The steps of FIGS. 14-18 may be implemented in the environment of FIG. 1, for example.

Figure 14:
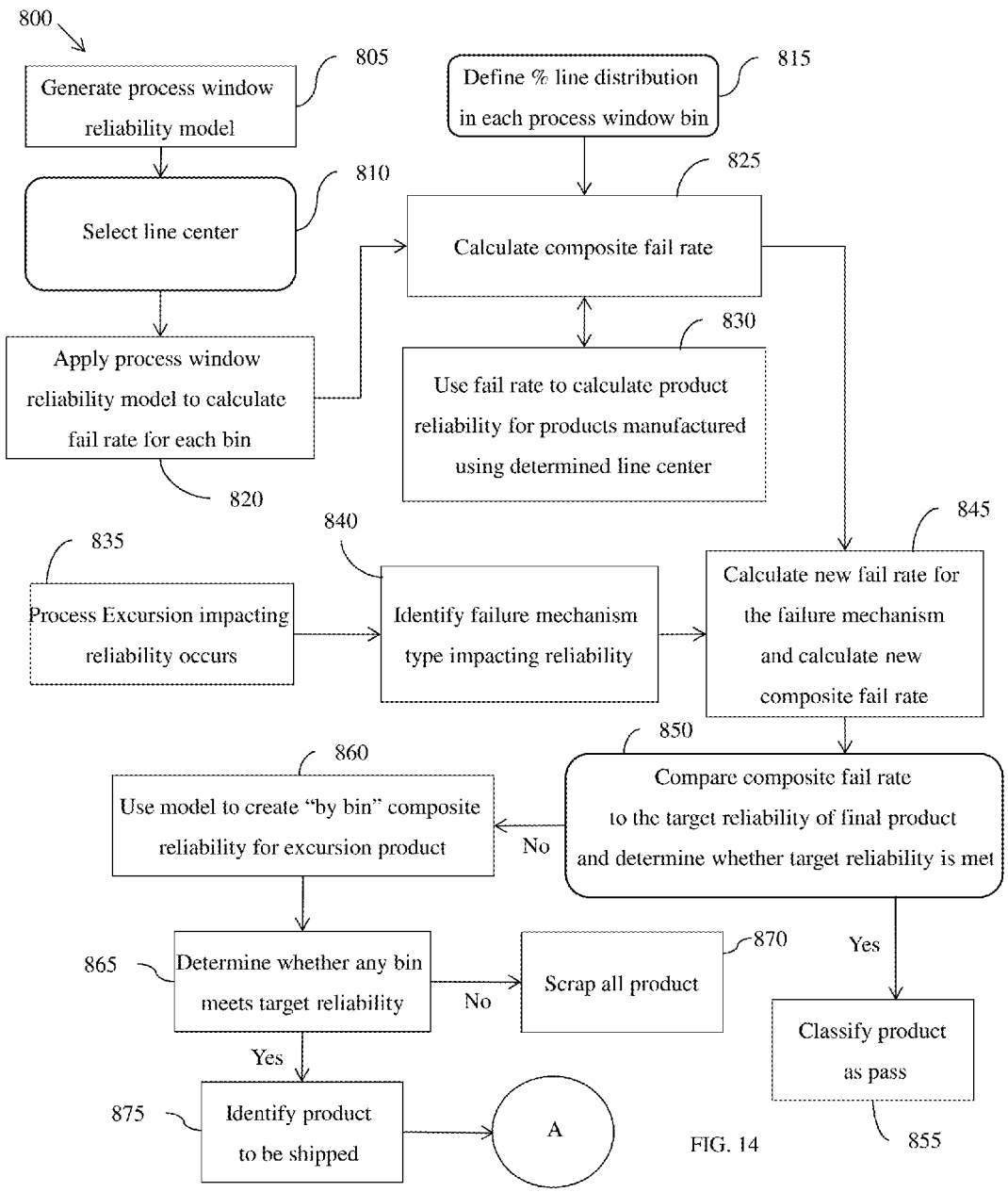
FIGS. 14-18 are illustrative process flows of implementing the system in accordance with aspects of the invention.

FIG. 14 shows a process 800 for determining the fail rate for each bin in an excursion product distribution in which burn-in has not been performed, and using the determined fail rate to identify parts to ship. Burn-in should be understood to comprise a process by which components of a system are exercised prior to being placed in service (and often, prior to the system being completely assembled from those components). The intention of burn-in is to detect those particular components that would fail as a result of the initial, high-failure rate portion of a bathtub curve of component reliability. If the burn-in period is made sufficiently long (and, perhaps, artificially stressful), the system can then be trusted to be mostly free of further early failures once the burn-in process is complete. Thus by applying a burn-in, early in-use system failures can be avoided at the expense (tradeoff) of a reduced yield caused by the burn-in process.

More specifically, the process 800 may start at step 805 and continue through process step 830 as described above with respect to process 500 shown in FIG. 9. However, at step 835 the process 800 may enter an excursion product phase to maximize reliability based on reliability models and minimize scrapped product and/or burn-in resources. In embodiments, the excursion product phase may comprise utilizing fail rates calculated for the excursion product to identify parts to ship.

More specifically, at step 835 a process excursion is determined that may be affecting reliability. In embodiments, the process excursion may be determined as any event that results from any number of failures during fabrication such as input of an incorrect recipe and/or tool failure. At step 840, failure mechanisms are identified that may impact reliability of the semiconductor product impacted by the process excursions. For example, parameters of the process line(s) that are skewed by the process excursion may be determined to influence EM, and thus the failure mechanism EM may be identified as potentially impacting reliability of the semiconductor product.

At step 845, a new fail rate may be calculated for each failure mechanism identified that may impact reliability of the semiconductor product impacted by the process excursions. For example, a different fail rate may be set for the failure mechanism as a function of the performance excursion process window, as similarly discussed above with respect to process 300 shown in FIG. 3. Thereafter, the fail rate for each bin and the percentage of the line distribution for each process window bin may be used to calculate a new composite fail rate. In embodiments, the composite failure rate may be for the product excursion distribution rather than the entire distribution. For example, the percentage of the line distribution or the known amount of the process distribution for each bin from step 815 may be used in conjunction with the fail rate calculated for each bin in step 820 and the new fail rates calculated for the excursion product to calculate an overall composite fail rate for the semiconductor product impacted by the process excursions. In embodiments, the calculation of the overall composite fail rate may comprise performing a weight average of reliability.

At step 850, the newly calculated composite fail rate is compared to the target reliability of the final semiconductor product, and a determination is made as to whether the target reliability is met. When the calculated composite fail rate (product reliability) meets the product reliability requirements then no further action is needed and the process 800 continues at step 855 to classify all of the semiconductor product as pass (i.e., all of the semiconductor product can be classified as pass because the process excursion has not impacted reliability in such a manner that reliability of the product is compromised).

However, when the calculated composite fail rate does not meet the product reliability requirements, then the process 800 continues at step 860. At step 860, the process window dependent reliability model is used to create a "by bin" composite reliability model for the excursion product. In other words, as described above with respect to process 300 shown in FIG. 3, aggregated or integrated reliability models are generated and optimized for each bin using the manufacturing line distributions for the excursion product.

At step 865, a determination is made as to whether any of the bins for the excursion product generated in step 860 meet the target reliability of the final semiconductor product. When none of the bins for the excursion product meet the target reliability of the final semiconductor product then the process 800 continues at step 870 where all of the semiconductor product is scrapped (i.e., the excursion impacted all of the semiconductor products in such a manner that they all fail to meet target reliability no matter where on the process distribution the excursion product is located).

However, when at least one of the bins for the excursion product meet the target reliability of the final semiconductor product then the process 800 continues at step 875 where the semiconductor product is identified for purposes of shipping. The identification process of the semiconductor product that may be shipped comprises either option process 900 or option process 1000, as shown in FIGS. 15 and 16 respectively.

Figure 15:
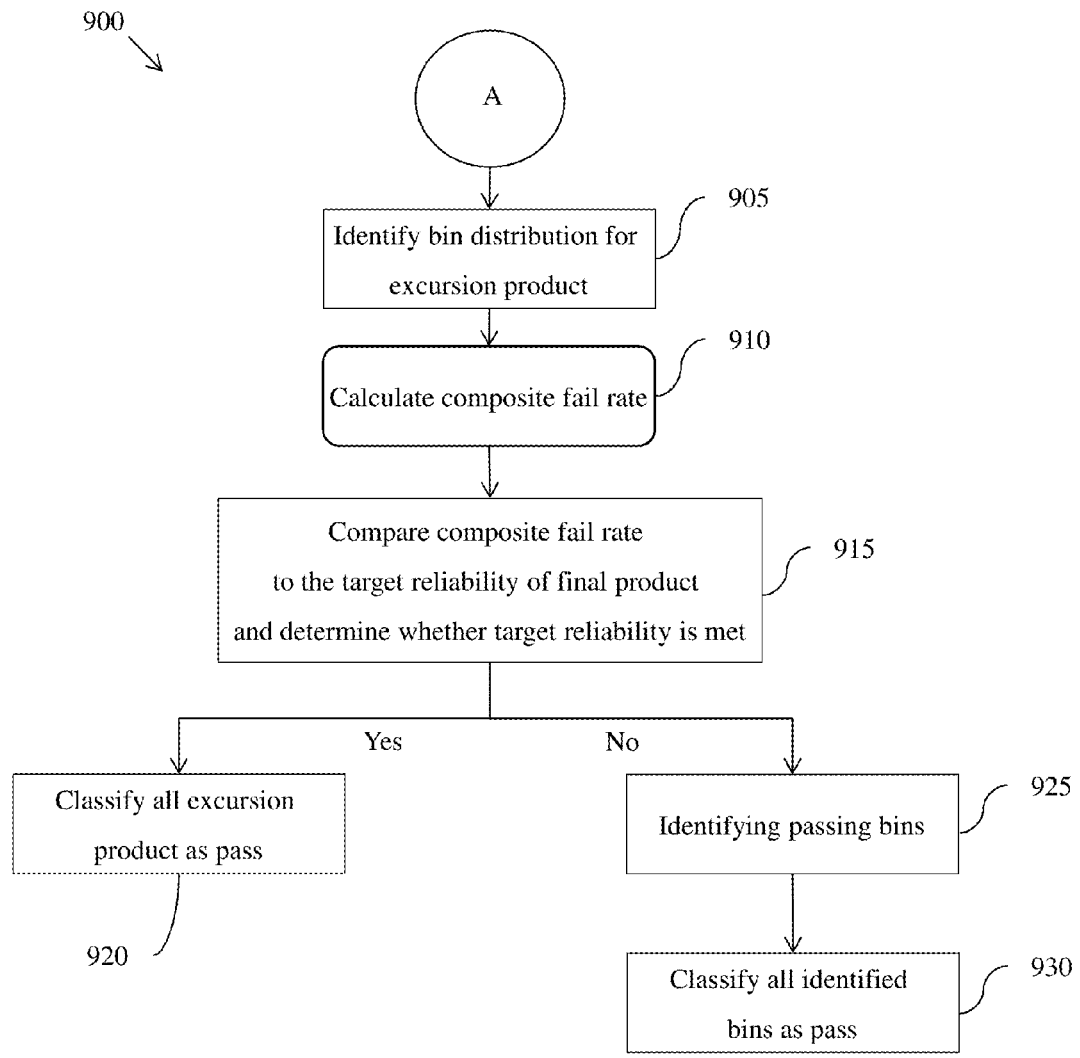
Figure 16:
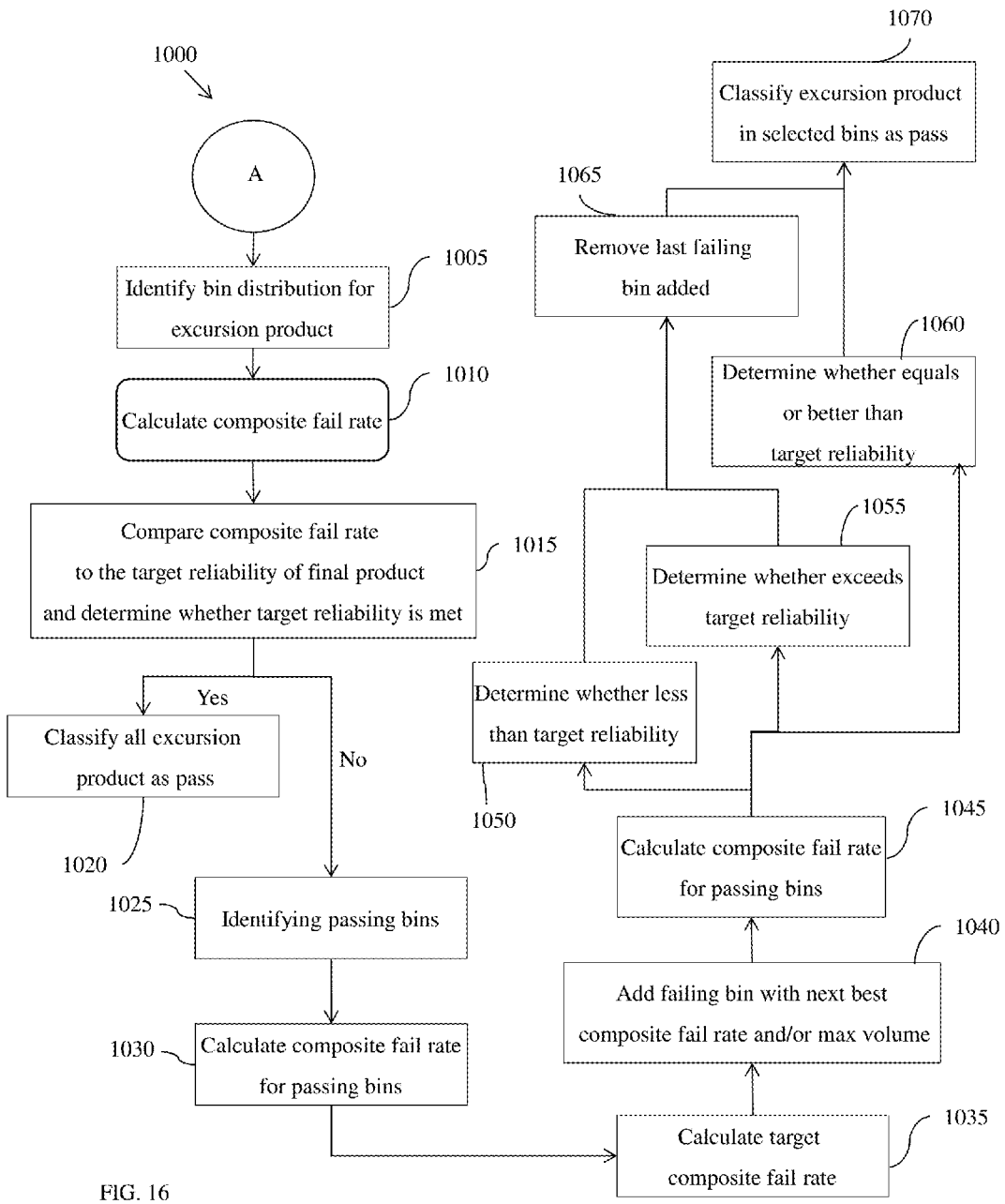

More specifically, FIG. 15 shows a process 900 for identifying excursion product that may be shipped. At step 905, bin distribution is identified for the excursion product. For example, a percentage of the line distribution for the excursion product is defined for each process window bin. For example, 2% of the excursion product may be defined for the process window bin at 3 sigma slow, 10% of the line distribution may be defined for the process window bin at 1.5 sigma slow, 25% of the line distribution may be defined for the process window bin at nominal, 35% of the line distribution may be defined for the process window bin at 1.5 sigma fast etc. In embodiments, the line distribution may be Gaussian or any other distribution so long as the distribution is defined.

At step 910, the fail rate for each bin and the new percentages of the line distribution for each process window bin of the excursion product are used to calculate a new composite fail rate. In embodiments, the composite failure rate may be for the product excursion distribution rather than the entire distribution. For example, the percentage of the line distribution or the known amount of the process distribution for each bin from step 905 may be used in conjunction with the fail rates calculated for each bin in steps 820 and 845 of process 800 shown in FIG. 14. In embodiments, the calculation of the overall composite fail rate may comprise performing a weight average of reliability.

At step 915, the newly calculated composite fail rate is compared to the target reliability of the final semiconductor product, and a determination is made as to whether the target reliability is met. When the calculated composite fail rate (product reliability) meets the product reliability requirements then no further action is needed and the process 900 continues at step 920 to classify all of the excursion semiconductor product as pass (i.e., all of the excursion semiconductor product can be classified as pass because the process excursion has not impacted reliability in such a manner that reliability of the excursion product is compromised).

However, when the calculated composite fail rate does not meet the product reliability requirements, then the process 900 continues at step 925. At step 925, bins of the excursion product that do meet the target reliability are identified on a bin by bin basis, and at step 930 only the bins that pass reliability are segmented from the remainder of the excursion product and classified as pass.

FIG. 16 shows a process 1000 for identifying excursion product that may be shipped. More specifically, the process 1000 may start at step 1005 and continue through process step 1025 as described above with respect to process 900 shown in FIG. 15. However, at step 1030 the process 10000 may enter an optimization phase to maximize excursion product shipped.

At step 1045, a target composite fail rate is calculated for the excursion product based on the composite fail rate calculated for each of the identified passing bin including the newly added failing bin with the next best composite fail rate and/or maximum volume. At step 1050, the target composite fail rate is compared to the target reliability of the final product, and a determination is made as to whether the target composite fail rate is less than the target reliability. When the target composite fail rate is less than the target reliability, the process 1000 continues at step 1065.

At step 1055, the target composite fail rate is compared to the target reliability of the final product, and a determination is made as to whether the target composite fail rate exceeds the target reliability. When the target composite fail rate exceeds the target reliability, the process continues at step 1065.

At step 1060, the target composite fail rate is compared to the target reliability of the final product, and a determination is made as to whether the target composite fail rate is equal to the target reliability. When the target composite fail rate is equal or better to the target reliability, the process continues at step 1070.

At step 1065, the failing bin with a next best composite fail rate and/or maximum volume is removed from the selection of bins identified as passing. At step 1070, the selection of identified bins is classified as pass.

Figure 17:
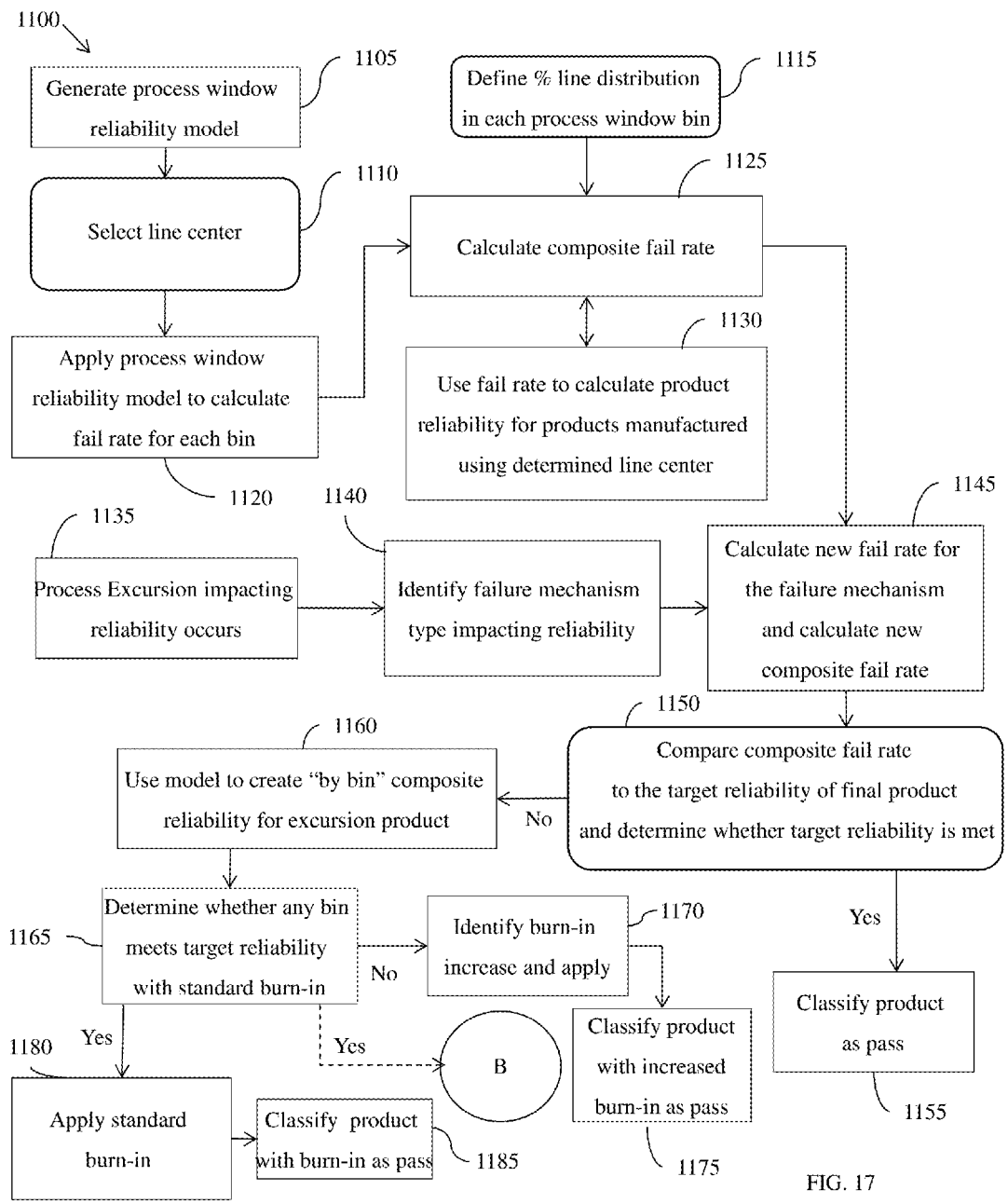

FIG. 17 shows a process 1100 for determining the fail rate for each bin in an excursion product distribution in which burn-in has been performed, and using the determined fail rate to identify parts to ship. More specifically, the process 1100 may start at step 1105 and continue through process step 1130 as described above with respect to process 500 shown in FIG. 9. However, at step 1135 the process 1100 may enter an excursion product phase to maximize reliability based on reliability models and minimize scrapped product and/or burn-in resources. In embodiments, the excursion product phase may comprise utilizing fail rates calculated for the excursion product to identify parts to ship. More specifically, the process 1100 continues from process step 1135 through process step 1150 as described above with respect to process 800 shown in FIG. 14.

At step 1150, when the calculated composite fail rate (product reliability) meets the product reliability requirements then no further action is needed and the process 1100 continues at step 1155 to classify all of the semiconductor product as pass (i.e., all of the semiconductor product can be classified as pass because the process excursion has not impacted reliability in such a manner that reliability of the product is compromised).

However, when the calculated composite fail rate does not meet the product reliability requirements, then the process 1100 continues at step 1160. At step 1160, the process window dependent reliability model is used to create a "by bin" composite reliability model for the excursion product. In other words, as described above with respect to process 300 shown in FIG. 3, aggregated or integrated reliability models are generated and optimized for each bin using the manufacturing line distributions for the excursion product.

At step 1165, a determination is made as to whether any of the bins for the excursion product generated in step 1160 meet the target reliability of the final semiconductor product with standard burn-in. When none of the bins for the excursion product meet the target reliability of the final semiconductor product with standard burn-in, then the process 1100 continues at step 1170 where burn-in parameters (e.g., amount of voltage applied or time of application) are increased and applied to each bin of the excursion product. At step 1175, the bins of the excursion product with increased burn-in are classified as pass.

However, when at least one of the bins of the excursion product meets the target reliability of the final semiconductor product with standard burn-in, then the process 1100 may continue at step 1180 where the standard burn-in is applied to the at least one bin of the excursion product that meets the target reliability. Additionally, burn-in parameters may be increased for each of the bins of the excursion product that do not meet the target reliability, and the increase burn-in may be applied to those bins. In embodiments, in which no burn-in parameters (e.g., standard or increased) cause the bins of the excursion product to meet the target reliability, then those bins are scrapped. At step 1185, the bins of the excursion product with standard burn-in are classified as pass.

Figure 18:
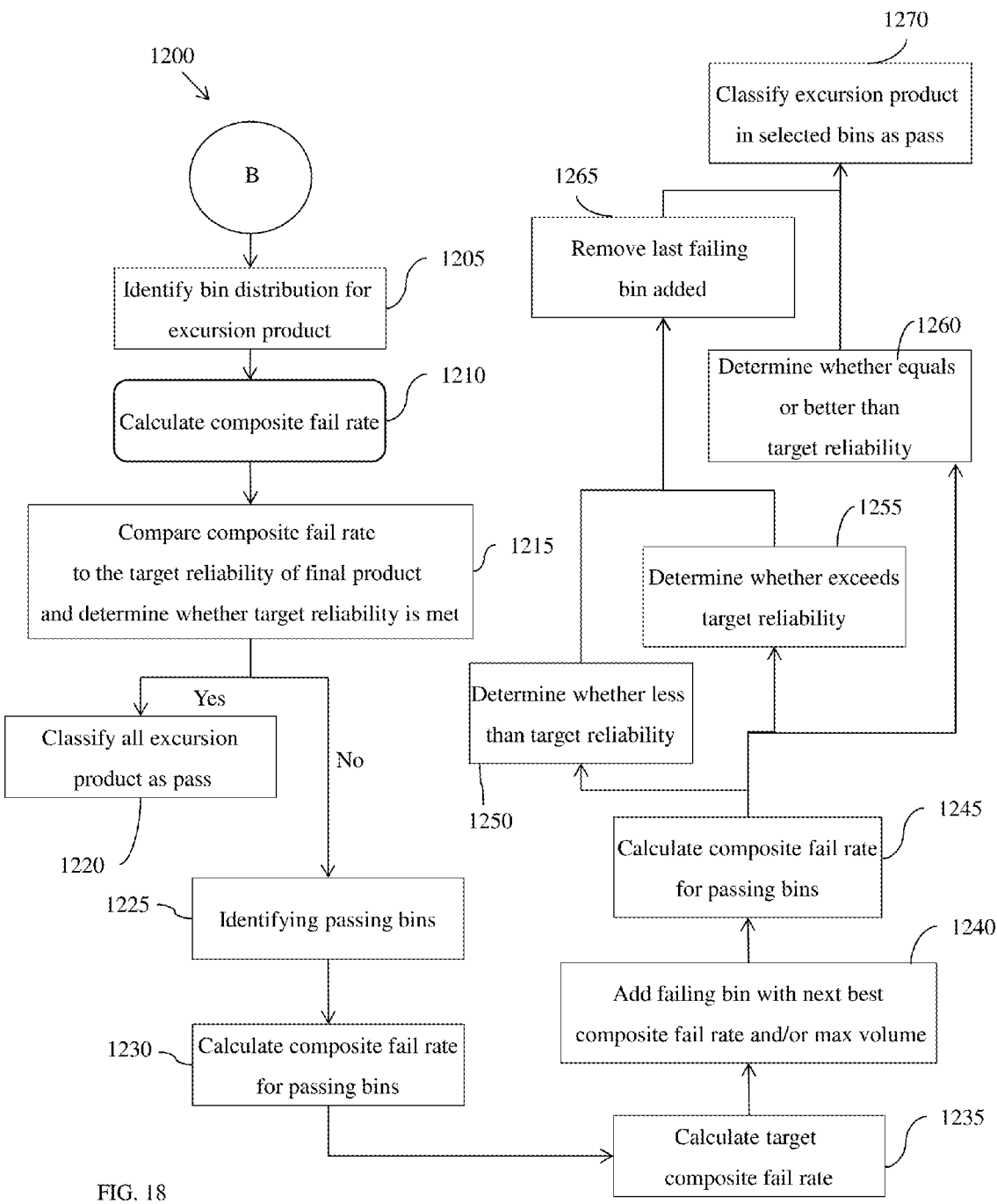

In additional or alternative embodiments, when at least one of the bins of the excursion product meets the target reliability of the final semiconductor product with standard burn-in, then the process 1100 may continue with process flow 1200 described with respect to FIG. 18 (process 1200 does not include steps to increase burn-in as was performed in step 1180). More specifically, FIG. 18 shows a process 1200 for identifying excursion product with standard burn-in that may be shipped. At step 1205, bin distribution is identified for the excursion product with standard burn-in. At step 1210, the fail rate for each bin and the new percentages of the line distribution for each process window bin of the excursion product with standard burn-in are used to calculate a new composite fail rate. At step 1215, the newly calculated composite fail rate is compared to the target reliability of the final semiconductor product, and a determination is made as to whether the target reliability is met. When the calculated composite fail rate (product reliability) meets the product reliability requirements then no further action is needed and the process 1200 continues at step 1220 to apply the standard burn-in and classify all of the excursion semiconductor product as pass (i.e., all of the excursion semiconductor product with standard burn-in can be classified as pass because the process excursion has not impacted reliability in such a manner that reliability of the excursion product is compromised).

However, when the calculated composite fail rate does not meet the product reliability requirements, then the process 1200 continues at step 1225. At step 1225, bins of the excursion product with standard burn-in that do meet the target reliability are identified on a bin by bin basis. At step 1230, a composite fail rate is calculated for the identified passing bins. At step 1235, a target composite fail rate is calculated for the excursion product with standard burn-in based on the composite fail rate calculated for each of the identified passing bins. At step 1240, a failing bin with a next best composite fail rate and/or maximum volume is added to the selection of bins identified as passing.

At step 1245, a target composite fail rate is calculated for the excursion product with standard burn-in based on the composite fail rate calculated for each of the identified passing bin including the newly added failing bin with the next best composite fail rate and/or maximum volume. At step 1250, the target composite fail rate is compared to the target reliability of the final product with burn-in, and a determination is made as to whether the target composite fail rate is less than the target reliability. When the target composite fail rate is less than the target reliability, the process 1200 continues at step 1265.

At step 1255, the target composite fail rate is compared to the target reliability of the final product, and a determination is made as to whether the target composite fail rate exceeds the target reliability. When the target composite fail rate exceeds the target reliability, the process continues at step 1265.

At step 1260, the target composite fail rate is compared to the target reliability of the final product with burn-in, and a determination is made as to whether the target composite fail rate is equal or better than the target reliability. When the target composite fail rate is equal or better than the target reliability, the process continues at step 1270.

At step 1265, the failing bin with a next best composite fail rate and/or maximum volume is removed from the selection of bins identified as passing. At step 1270, the selection of identified bins with standard burn-in is classified as pass.

Design Process

Figure 19:
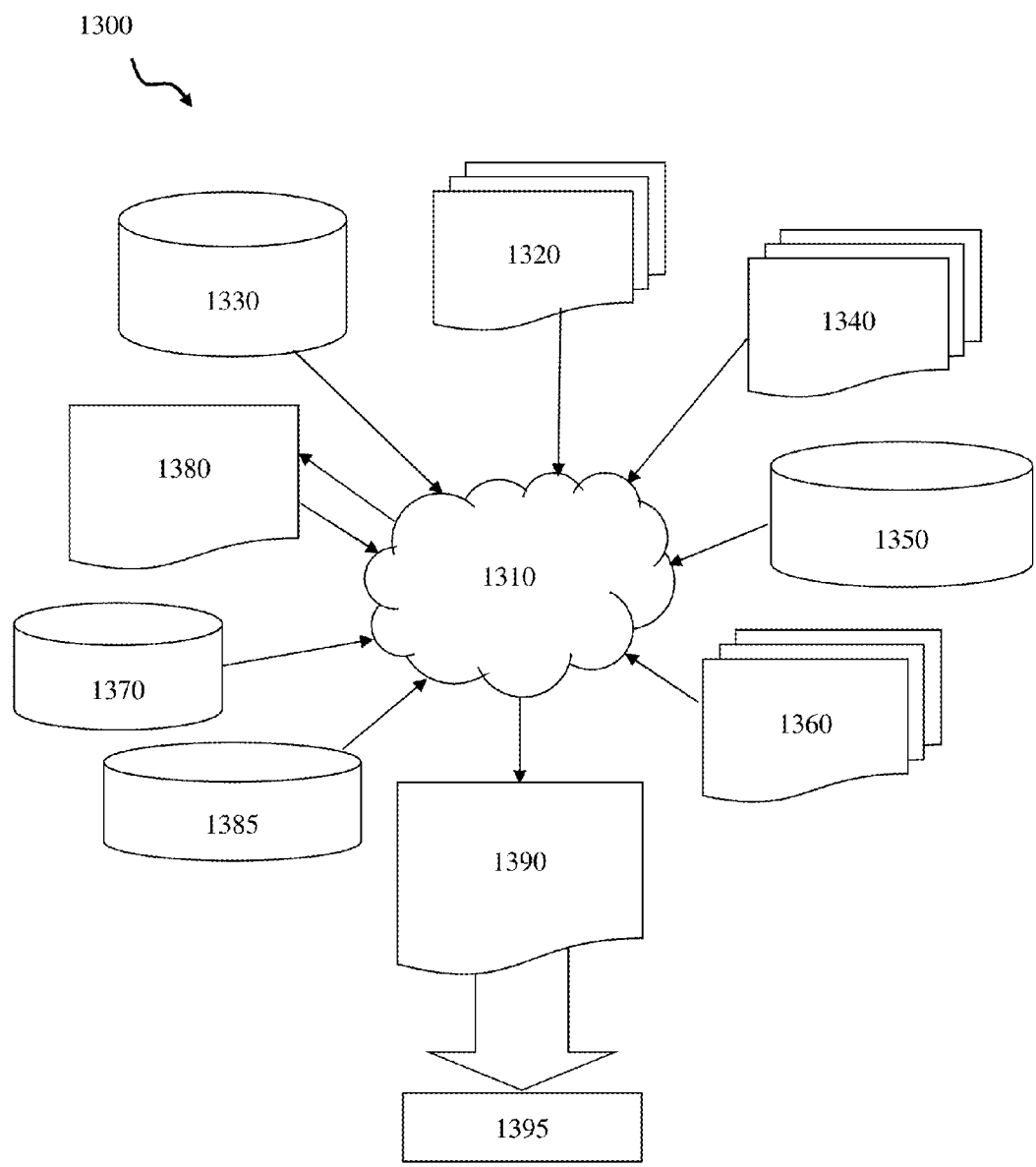
FIG. 19 is a flow diagram of a design process used in semiconductor design, manufacture, and/or test.

FIG. 19 is a flow diagram of a design process used in semiconductor design, manufacture, and/or test used with the system and method of the present invention. FIG. 19 shows a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of the design structures and/or devices. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 19 illustrates multiple such design structures including an input design structure 1320 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system, which can be implemented with the method and system of the present invention. As such, design structure 1320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures to generate a netlist 1380 which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is resynthesized one or more times depending on design specifications and parameters for the device. As with other design structure types described herein, netlist 1380 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1340, characterization data 1350, verification data 1360, design rules 1370, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390.

Design structure 1390 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more devices. In one embodiment, design structure 1390 may comprise a compiled, executable HDL simulation model that functionally simulates the devices.

Design structure 1390 may also employ a data format used for the exchange of layout data of integrated circuits and/or symbolic data format (e.g. information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 1390 may then proceed to a stage 1395 where, for example, design structure 1390: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating an aggregate reliability model using a manufacturing line distribution, wherein the aggregate reliability model is generated using reliability failure mechanisms;
selecting a line center within a process window of the aggregate reliability model;
assigning a percentage of the manufacturing line distribution to each performance process window bin within the process window;
calculating a product fail rate for each of the performance process window bins, wherein the calculating the product fail rate comprises setting different fail rates for each of the reliability failure mechanisms as a function of the performance process window for each performance process window bin;
calculating a composite fail rate for the manufacturing line distribution based on the percentage of the manufacturing line distribution assigned to each performance process window bin and the product fail rate calculated for each of the performance process window bins;
calculating a product reliability fail rate for a semiconductor product manufactured at the selected line center such that reliability for the semiconductor product is assessed for the selected line center, wherein the product reliability fail rate is calculated based on the composite fail rate for the manufacturing line distribution;
calculating a product reliability fail rate for a semiconductor product manufactured at the selected line center such that reliability for the semiconductor product is assessed for the selected line center, wherein the product reliability fail rate is calculated based on the composite fail rate for the manufacturing line distribution; and
optimizing the line center to minimize the product fail rate for each of the performance process window bins, wherein the optimizing the line center comprises:
comparing the product reliability fail rate to a manufacturing line centering fail rate;
determining whether the product reliability fail rate meets product reliability requirements;
when the product reliability fail rate does not meet product reliability requirements, reevaluating the reliability failure mechanisms and selecting at least one new reliability failure mechanism;

identifying a process point within the process window that has a lower fail rate for the new reliability failure mechanism; and repeating the steps of selecting the line center, assigning the percentage of the manufacturing line distribution, and calculating the product fail rate using a newly selected line center and the new reliability failure mechanism; and wherein at least the step of generating the aggregate reliability model is performed using a processor.

2. A method comprising:

generating an aggregate reliability model using a manufacturing line distribution, wherein the aggregate reliability model is generated using reliability failure mechanisms;

selecting a line center within a process window of the aggregate reliability model;

assigning a percentage of the manufacturing line distribution to each performance process window bin within the process window;

calculating a product fail rate for each of the performance process window bins, wherein the calculating the product fail rate comprises setting different fail rates for each of the reliability failure mechanisms as a function of the performance process window for each performance process window bin;

calculating a composite fail rate for the manufacturing line distribution based on the percentage of the manufacturing line distribution assigned to each performance process window bin and the product fail rate calculated for each of the performance process window bins;

calculating a product reliability fail rate for a semiconductor product manufactured at the selected line center such that reliability for the semiconductor product is assessed for the selected line center, wherein the product reliability fail rate is calculated based on the composite fail rate for the manufacturing line distribution;

calculating a product reliability fail rate for a semiconductor product manufactured at the selected line center such that reliability for the semiconductor product is assessed for the selected line center, wherein the product reliability fail rate is calculated based on the composite fail rate for the manufacturing line distribution and optimizing the line center to minimize the product fail rate for each of the performance process window bins, wherein the optimizing the line center comprises:

comparing the product reliability fail rate to a manufacturing line centering fail rate;

determining whether the product reliability fail rate meets product reliability requirements; and utilizing a process flow to ensure that a best center line is selected to optimize the product reliability fail rate meeting the product reliability requirements, wherein the process flow includes a search to find values of an objective function given a defined domain including a variety of different types of objective functions and different types of domain; and wherein at least the step of generating the aggregate reliability model is performed using a processor.

3. A method comprising:

generating an aggregate reliability model using a manufacturing line distribution of a semiconductor product;

defining performance process window bins of a performance window for an excursion event of the semiconductor product;

determining a fail rate for each of the performance process window bins;

disposing of production shipment for the semiconductor product as a function of the fail rate determined for each of the performance process window bins;

determining whether the semiconductor product is to receive a reliability screen;

when the semiconductor product is not to receive the reliability screen, determining whether the excursion event is impacting reliability of the semiconductor product;

identifying a failure mechanism based on the excursion event that is impacting the calculating a composite fail rate using the failure mechanism;

comparing the composite fail rate to a target reliability; and when the composite fail rate meets the target reliability, shipping the semiconductor product, wherein at least the step of generating the aggregate reliability model is performed using a processor.

4. The method of claim 3, further comprising:

when the composite fail rate does not meet the target reliability, using the aggregate reliability model to create a composite aggregate reliability model for each of the performance process window bins based on the excursion event;

determining whether at least one of the performance process window bins meet the target reliability; and when none of the performance process window bins meet the target reliability, scrapping the semiconductor product.

5. The method of claim 4, further comprising when at least one of the performance process window bins meet the target reliability, identifying portions of the semiconductor product that can be shipped.

6. A method comprising:

generating an aggregate reliability model using a manufacturing line distribution of a semiconductor product;

defining performance process window bins of a performance window for an excursion event of the semiconductor product;

determining a fail rate for each of the performance process window bins;

disposing of production shipment for the semiconductor product as a function of the fail rate determined for each of the performance process window bins;

determining whether the semiconductor product is to receive a reliability screen;

when the semiconductor product is to receive the reliability screen, determining whether the excursion event is impacting reliability of the semiconductor product;

identifying a failure mechanism based on the excursion event that is impacting the reliability;

calculating a composite fail rate using the failure mechanism;

comparing the composite fail rate to a target reliability; and when the composite fail rate meets the target reliability, shipping the semiconductor product with a standard reliability screen, wherein at least the step of generating the aggregate reliability model is performed using a processor.

7. The method of claim 6, further comprising:

when the composite fail rate does not meet the target reliability, using the aggregate reliability model to create a composite aggregate reliability model for each of the performance process window bins based on the excursion event;

determining whether at least one of the performance process window bins meet the target reliability with the standard reliability screen; and when none of the performance process window bins meet the target reliability, identifying an increase in the standard reliability screen, applying the increased standard reliability screen to each of performance process window bins, and shipping the semiconductor product with the increased standard reliability screen.

8. The method of claim 7, further comprising when at least one of the performance process window bins meet the target reliability, identifying portions of the semiconductor product that can be shipped with the standard reliability screen or the increased reliability screen.

* * * * *